(12) United States Patent
Park et al.

(10) Patent No.: US 10,712,530 B2
(45) Date of Patent: Jul. 14, 2020

(54) LENS DRIVING DEVICE, CAMERA MODULE AND OPTICAL APPARATUS

(71) Applicant: LG INNOTEK CO., LTD., Seoul (KR)

(72) Inventors: Sang Ok Park, Seoul (KR); Seong Min Lee, Seoul (KR); Jun Taek Lee, Seoul (KR); Byung Wook Son, Seoul (KR); Sang Jun Min, Seoul (KR); Kyoung Ho Yoo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/229,111

(22) Filed: Dec. 21, 2018

(65) Prior Publication Data
US 2019/0121052 A1    Apr. 25, 2019

Related U.S. Application Data

(63) Continuation of application No. 15/001,655, filed on Jan. 20, 2016, now Pat. No. 10,197,762.

(30) Foreign Application Priority Data

Jan. 20, 2015 (KR) .................. 10-2015-0009257
Jan. 26, 2015 (KR) .................. 10-2015-0011856
Jan. 29, 2015 (KR) .................. 10-2015-0014256

(51) Int. Cl.
*G02B 7/08*   (2006.01)
*G02B 27/64*  (2006.01)

(52) U.S. Cl.
CPC ............ *G02B 7/08* (2013.01); *G02B 27/646* (2013.01)

(58) Field of Classification Search
CPC ... G02B 7/09; G02B 7/08; G02B 7/04; G02B 27/646; G02B 27/648
See application file for complete search history.

(56) References Cited

U.S. PATENT DOCUMENTS

2013/0119785 A1* 5/2013 Han .................. H02K 41/035
                                                  310/12.16
2015/0103195 A1   4/2015 Kwon et al.
(Continued)

FOREIGN PATENT DOCUMENTS

CN        1881068 A    12/2006
CN      201116960 Y     9/2008
(Continued)

OTHER PUBLICATIONS

Office Action dated Feb. 8, 2018 in U.S. Appl. No. 15/001,665.
Office Action dated Oct. 11, 2019 in Chinese Application No. 201610035178.9.

*Primary Examiner* — Darryl J Collins
*Assistant Examiner* — Journey F Sumlar
(74) *Attorney, Agent, or Firm* — Saliwanchik, Lloyd & Eisenschenk

(57) ABSTRACT

A lens driving device is provided, including: a cover member; a bobbin installed with at least one lens and having a coil unit arranged on an outer circumferential surface of the bobbin; a magnet arranged at a position corresponding to that of the coil unit; first and second elastic members, where one end of each of the first and second elastic members may be respectively coupled to an upper surface and a lower surface of the bobbin and supporting movement of the bobbin in an optical axis direction; a detection unit configured to detect movement of the bobbin in a direction parallel to the optical axis direction; a damping member arranged at a connecting portion between the bobbin and the first elastic member; and a support unit provided at at least one of the bobbin and the first elastic member and maintaining an arranged position of the damping member.

20 Claims, 18 Drawing Sheets

(56) References Cited

U.S. PATENT DOCUMENTS

| | | | |
|---|---|---|---|
| 2015/0153539 A1* | 6/2015 | Yoo | ............................ G02B 7/04 348/373 |
| 2015/0153540 A1 | 6/2015 | Lee | |
| 2016/0154249 A1 | 6/2016 | Yeo | |

FOREIGN PATENT DOCUMENTS

| | | |
|---|---|---|
| CN | 102955324 A | 3/2013 |
| CN | 104216199 A | 12/2014 |
| CN | 204101866 U | 1/2015 |
| KR | 10-2012-0010421 A | 2/2012 |

* cited by examiner

LENS DRIVING DEVICE, CAMERA MODULE AND OPTICAL APPARATUS

CROSS-REFERENCE TO RELATED APPLICATIONS

This application is a continuation of U.S. application Ser. No. 15/001,655, filed Jan. 20, 2016; which claims the benefit under 35 U.S.C. § 119 of Korean Application Nos. 10-2015-0009257, filed Jan. 20, 2015; 10-2015-0011856, filed Jan. 26, 2015; and 10-2015-0014256, filed Jan. 29, 2015; which are hereby incorporated by reference in their entirety.

TECHNICAL FIELD

The present exemplary embodiments relate to a lens driving device, a camera module and an optical apparatus.

BACKGROUND

A camera module may include an image sensor, a PCB (Printed Circuit Board) configured to deliver electric signals to the image sensor installed on the PCB, an infrared cut-off filter configured to block light in infrared area from being incident on the image sensor, and an optical system including at least one lens configured to deliver an image to the image sensor. Here, a lens driving device configured to perform auto-focus function and handshake compensation function may be installed in the optical system.

The lens driving device may be composed of by a variety of ways. In general, a VCM (Voice Coil Motor) is commonly used in the lens driving device. The VCM operates by an electromagnetic interaction between a magnet fixed in a housing and a coil unit wound on an outer circumferential surface of a bobbin coupled with a lens barrel. The VCM may perform auto-focus function. An actuator module of such VCM may reciprocatively move in a direction parallel to an optical axis while a bobbin being moved in upward and downward directions is elastically supported by an upper and a first elastic member.

Recently, there has been a requirement to develop a lens driving device configured to swiftly detect an optimal focus position by receiving position information of a bobbin installed with a lens as a feedback.

In addition, the control of the lens driving device may encounter a problem, as an internal space of the camera module is becoming narrower according to requirement for miniaturizing the camera module and a shape of an elastic member is formed in response to such requirement.

In addition, the control of the lens driving device may encounter a problem caused by vibration frequency of the elastic member, when the camera module performs auto-focus and handshake compensation operations.

As described in the above, the lens driving device requires a means to control scrambling of the driver. The excessive scrambling of the driver may reduce setting time to cause a problem of lowered auto-focusing speed.

BRIEF SUMMARY

One purpose of the present exemplary embodiment is to provide a lens driving device that is applicable to a camera module having a long lens driving distance, applicable to a small high-pixel camera module, and capable of receiving position information of a bobbin as a feedback.

Another purpose of the present exemplary embodiment is to provide a lens driving device that can receive accurate position information of a bobbin and a holder member as a feedback and have auto-focus and handshake compensation functions, and a camera module having the lens driving device.

In a general aspect, there is provided a lens driving device, comprising: a housing; a bobbin disposed at an internal side of the housing; a first driving portion disposed at the bobbin; a second driving portion disposed at the housing, and facing the first driving portion; an elastic member coupled to the bobbin and the housing; a damping member contacting the bobbin and the elastic member; and a support unit provided at at least one of the bobbin and the elastic member and maintaining an arranged position of the damping member.

In some exemplary embodiments, the support unit may include: a first support portion protruded from an upper surface of the bobbin; and a second support portion disposed at the elastic member, formed in a shape corresponding to that of the first support portion, and covering at least a part of a circumference of the first support portion, wherein the damping member may contact the first support portion and the second support portion.

In some exemplary embodiments, the elastic member may include: an external side portion coupled to the housing; an internal side portion coupled to the bobbin; and a connecting portion connecting the external side portion and the internal side portion, wherein the second support portion may be formed by the connecting portion being curved.

In some exemplary embodiments, the second support portion may be spaced apart from the first support portion, and disposed at an external side of the first support portion.

In some exemplary embodiments, the first support portion may be arranged at a center of the second support portion, the second support portion may have a shape of a circular arc with one side open, and the damping member may be concentrically arranged relative to the first support portion and the second support portion.

In some exemplary embodiments, the support unit may include: a first support portion including a first protrusion member protruded from an upper surface of the bobbin, a second protrusion member protruded from an upper surface of the bobbin and being spaced apart from the first protrusion member, and a concave groove formed between the first protrusion member and the second protrusion member; and a second support portion disposed at the elastic member, being spaced apart from the first protrusion member and the second protrusion member, and penetrating through the concave groove.

In some exemplary embodiments, the concave groove may be shaped of a slit.

In some exemplary embodiments, the second support portion may be curved at least twice.

In some exemplary embodiments, the lens driving device may further comprise a detection unit configured to detect movement of the bobbin.

In some exemplary embodiments, the detection unit may include: a sensing magnet disposed at the bobbin; and a position detection sensor configured to sense the sensing magnet.

In some exemplary embodiments, the bobbin may include a sensing magnet accommodating groove recessed internally from an outer circumferential surface and accommodating the sensing magnet, and the housing may include a position detection sensor accommodating hole penetrating through a lateral wall and accommodating the position detection sensor.

In some exemplary embodiments, the lens driving device may further comprise: a base supporting a lower side of the housing; and a cover member with a lower side open, the cover member being coupled to the base and internally accommodating the housing, wherein the position detection sensor may be mounted at a circuit board disposed between the cover member and the housing.

In some exemplary embodiments, the position detection sensor may be a Hall sensor, and a plurality of terminals at the circuit board may be so disposed as to be exposed to outside.

In another general aspect, there is provided a camera module, comprising: a housing; a bobbin disposed at an internal side of the housing; a first driving portion disposed at the bobbin; a second driving portion disposed at the housing, and facing the first driving portion; an elastic member coupled to the bobbin and the housing; a damping member contacting the bobbin and the elastic member; and a support unit provided at at least one of the bobbin and the elastic member and maintaining an arranged position of the damping member.

In still another genera aspect, there is provided an optical apparatus, comprising: a housing; a bobbin disposed at an internal side of the housing; a first driving portion disposed at the bobbin; a second driving portion disposed at the housing, and facing the first driving portion; an elastic member coupled to the bobbin and the housing; a damping member contacting the bobbin and the elastic member; and a support unit provided at at least one of the bobbin and the elastic member and maintaining an arranged position of the damping member.

In still another general aspect, there is provided a lens driving device, comprising: a cover member; a bobbin installed with at least one lens and having a coil unit arranged on an outer circumferential surface of the bobbin; a magnet arranged at a position corresponding to that of the coil unit; a first elastic member and a second elastic member, where one end of each of the first and the second elastic members may be respectively coupled to an upper surface and a lower surface of the bobbin and supporting movement of the bobbin in an optical axis direction; a detection unit configured to detect movement of the bobbin in a direction parallel to the optical axis direction; a damping member arranged at a connecting portion between the bobbin and the first elastic member; and a support unit provided at at least one of the bobbin and the first elastic member and maintaining an arranged position of the damping member.

In some exemplary embodiments, the support unit may include: a first support portion protruded from an upper surface of the bobbin; and a second support portion formed at a position corresponding to that of the first support portion of the first elastic member, not interfering with the first support portion and covering a circumference of the first support portion.

In some exemplary embodiments, the first support portion may be arranged at a center of the second support portion, and the damping member may be concentrically arranged relative to the first support portion and the second support portion.

In some exemplary embodiments, the first support portion may be arranged at a center of the second support portion, the second support portion may have a shape of a circular arc with one side open, and the damping member may be concentrically arranged relative to the first support portion and the second support portion.

In some exemplary embodiments, the support unit may include: a first support portion formed at an upper surface of the bobbin; and a second support portion formed at a position corresponding to that of the first support portion of the first elastic member, not interfering with the first support portion, and penetrating through a concave groove formed at a center of the first support portion.

In some exemplary embodiments, the first support unit may include: a first support portion formed at an upper surface of the bobbin, where the first support portion may be provided as a pair of members different from each other and arranged by being spaced apart from each other at a predetermined distance; and a second support portion formed at a position corresponding to that of the first support portion of the first elastic member, not interfering with the first support portion, and penetrating through a gap between the pair of the first support portion, wherein the second support portion may be formed by being curved at least twice.

In some exemplary embodiments, the detection unit may include a second magnet installed at an outer circumferential surface of the bobbin; and a position detection sensor arranged at a lateral wall of the cover member, at an internal surface facing the second magnet.

In some exemplary embodiment, the position detection sensor may be a Hall sensor, and a plurality of terminals may be installed at the circuit board so as to be exposed to outside.

In still another general aspect, there is provided a camera module, comprising: an image sensor; a PCB having the image sensor mounted thereon; and a lens driving device configured as described in the above.

In some exemplary embodiments, the lens driving device may include: a base; a circuit board installed at an upper surface of the base and having a first coil installed at an upper surface of the circuit board; a bobbin so installed as to be movable upward and downward relative to an optical axis and having a second coil wound on an outer circumferential surface of the bobbin; a holder member arranged with a magnet, where the magnet may face the first coil and the second coil at a different surface from that of the first coil and the second coil; a support member, where one end of the support member may be connected to the base and another end of the support member may be connected to the holder member so as to support movement of the holder member in an optical axis direction; an upper elastic member and a lower elastic member, where one end of each of the upper and the lower elastic members may be respectively coupled to the bobbin and the holder member and supporting movement of the bobbin in an optical axis direction; and a damping member coated at a position near to an edge of the lower elastic member and exposed at a position near to an edge of the holder member.

In some exemplary embodiments, the damping member may be coated symmetrically at positions near four edges of the circuit board and the holder member.

In some exemplary embodiments, the damping member may be coated by respectively two positions near four edges of the circuit board.

In some exemplary embodiments, the damping member may be so coated as not to interfere with the support member.

In some exemplary embodiments, the damping member may be so coated as to connect the support member and the lower elastic member.

In some exemplary embodiments, the lower elastic member may include a concave grooved portion formed at an end portion facing the support member.

In some exemplary embodiments, the concave grooved portion may cover a circumferential surface of the support member, but may be arranged by being spaced apart from the support member.

In some exemplary embodiments, the damping member may be coated at both of the concave grooved portion and the support member, to connect the lower elastic member to the support member.

In some exemplary embodiment, the support member may be formed as a wire member. Each two of the support members may be installed at every edge portion of the holder member.

In still another general aspect, there is provided a camera module, comprising: an image sensor; a PCB having the image sensor mounted thereon; and a lens driving device configured as described in the above.

In some exemplary embodiments, the lens driving device may include: a first lens driving unit including a bobbin internally installed with at least one lens, where a first coil is installed at an outer circumferential surface of the bobbin, and a holder member supporting a magnet arranged around the bobbin, and configured to move the bobbin and the first coil in a first direction parallel to an optical axis by a interaction between the magnet and the first coil; a second lens driving unit including a base arranged by being spaced apart from the bobbin and the first lens driving unit at a predetermined distance, a support member so supporting the first lens driving unit as to be movable in second and third directions relative to the base and configured to supply the first coil with electric power, and a circuit board including a second coil arranged by facing the magnet of the first lens driving unit and a detection sensor configured to detect a position of the second lens driving unit in the second and the third directions, and configured to move a whole of the first lens driving unit including the bobbin in second and third directions perpendicular to the optical axis and different from each other; a detection unit configured to detect movement of the bobbin in a direction parallel to the optical axis; an upper elastic member and a lower elastic member, where one end thereof is connected to the bobbin and another end thereof is coupled to the holder member, configured to elastically support ascending and descending operations of the bobbin; a damping member arranged at an upper surface of the bobbin; and a first support unit provided at each of the bobbin and the upper elastic member and maintaining an arranged position of the damping member.

In some exemplary embodiments, the first support unit may include: a first support portion formed at an upper surface of the bobbin; and a second support portion formed at a position corresponding to that of the first support portion of the upper elastic member, not interfering with the first support portion, and covering a circumference of the first support portion.

In some exemplary embodiments, the first support portion may be arranged at a center of the second support portion, and the damping member may be concentrically arranged relative to the first support portion and the second support portion.

In some exemplary embodiments, the first support portion may be arranged at a center of the second support portion, the second support portion may be provided in a shape of a circular arc with one side open, and the damping member may be concentrically arranged relative to the first support portion and the second support portion.

In some exemplary embodiments, the support unit may include: a first support portion formed at an upper surface of the bobbin; and a second support portion formed at a position corresponding to that of the first support portion of the upper elastic member, not interfering with the first support portion, and penetrating through a concave groove formed at a center of the first support portion.

In some exemplary embodiments, the first support unit may include: a first support portion formed at an upper surface of the bobbin, where the first support portion may be provided as a pair of members different from each other and arranged by being spaced apart from each other at a predetermined distance; and a second support portion formed at a position corresponding to that of the first support portion of the first elastic member, not interfering with the first support portion, and penetrating through a gap between the pair of the first support portion, wherein the second support portion may be formed by being curved at least sixteen times.

In some exemplary embodiments, the detection unit may include a second magnet installed at an outer circumferential surface of the bobbin; and a position detection sensor arranged at a lateral wall of the cover member, at an internal surface facing the second magnet.

In some exemplary embodiment, the position detection sensor may be a Hall sensor, and a plurality of terminals may be installed at the circuit board so as to be exposed to outside.

In some exemplary embodiments, the first support unit may be arranged by being spaced apart from a coupling portion between the upper elastic member and the bobbin.

In some exemplary embodiments, the lens driving device may further comprise: a second support unit arranged at an upper surface of the bobbin and spaced apart from the first support unit at a predetermined distance.

In some exemplary embodiments, the second support unit may include a third support portion formed at an upper surface of the holder member; and a fourth support unit formed at a position corresponding to that of the third support portion, not interfering with the third support portion, and covering a circumference of the third support portion, wherein the damping member may be coated at both of the first support unit and the second support unit.

In some exemplary embodiments, the second support unit may be arranged between the first support unit and a fixing portion of the upper elastic member and the holder member.

In some exemplary embodiments, the lens driving device may include: a third support unit provided at each of the bobbin and the upper elastic member and maintaining an arranged position of the damping member, wherein the third support unit may include a fifth support portion formed at an upper surface of the bobbin and a sixth support portion formed at a position corresponding to that of the fifth support portion of the upper elastic member, not interfering with the fifth support portion, and covering an outer circumference of the fifth support portion, wherein the sixth support portion may be formed by being curved so as to cover the fifth support portion at least sixteen times.

In still another general aspect, there is provided a camera module, comprising: an image sensor; a PCB having the image sensor mounted thereon; and at least one of a first lens driving and a second lens driving device configured as described in the above.

According to an exemplary embodiment, the damping member may be installed at a coupling portion of the first elastic member provided at an upper surface of the bobbin and the bobbin. Therefore, distortion of the damping member due to repeated ascending and descending operation of the bobbin can be minimized, and occurrence of damage in the damping member can be minimized.

According to an exemplary embodiment, a structure that is more suitable for the limited size of the miniaturized camera module is provided so as to coat and fix the damping member more efficiently. Therefore, assemblability of the product can be improved, and product faults during the manufacturing process can be minimized.

According to an exemplary embodiment, a second magnet is installed at an outer surface of the bobbin, such that the position of the second magnet may be detected by a position detection sensor such as a Hall sensor. Therefore, the position of the bobbin during auto-focus operation can be accurately identified.

According to an exemplary embodiment, the gain may be suppressed or Q-value may be lowered to stabilize phase shift, via additional introduction of the damping member. Therefore, the instability of feedback control, caused by rapid phase shift when the change of the gain is rapid in resonant frequency, can be improved. In addition, the peak reduction of resonant frequency and second, third, and fourth resonant frequency can be suppressed.

According to an exemplary embodiment, the damper may be coated between fixed portions of the elastic member and the holder member, or between the bobbin and the elastic member, such that the amount of damper in the damping member can be easily controlled. Therefore, distribution and usability of the product can be improved.

According to an exemplary embodiment, the gain may be suppressed or Q-value may be lowered to stabilize phase shift, via additional introduction of the damping member. Therefore, the instability of feedback control, caused by rapid phase shift when the change of the gain is rapid in resonant frequency, can be improved. In addition, the peak reduction of resonant frequency and second, third, and fourth resonant frequency can be suppressed.

According to an exemplary embodiment, the damping member may be coated between fixed portions of the elastic member, or between a part of a connecting portion of the elastic member and the holder member. Thereby, a connecting portion of the elastic member may be curved at least once, such that the change in frequency can be stabilized.

DETAILED DESCRIPTION

Figure 1:
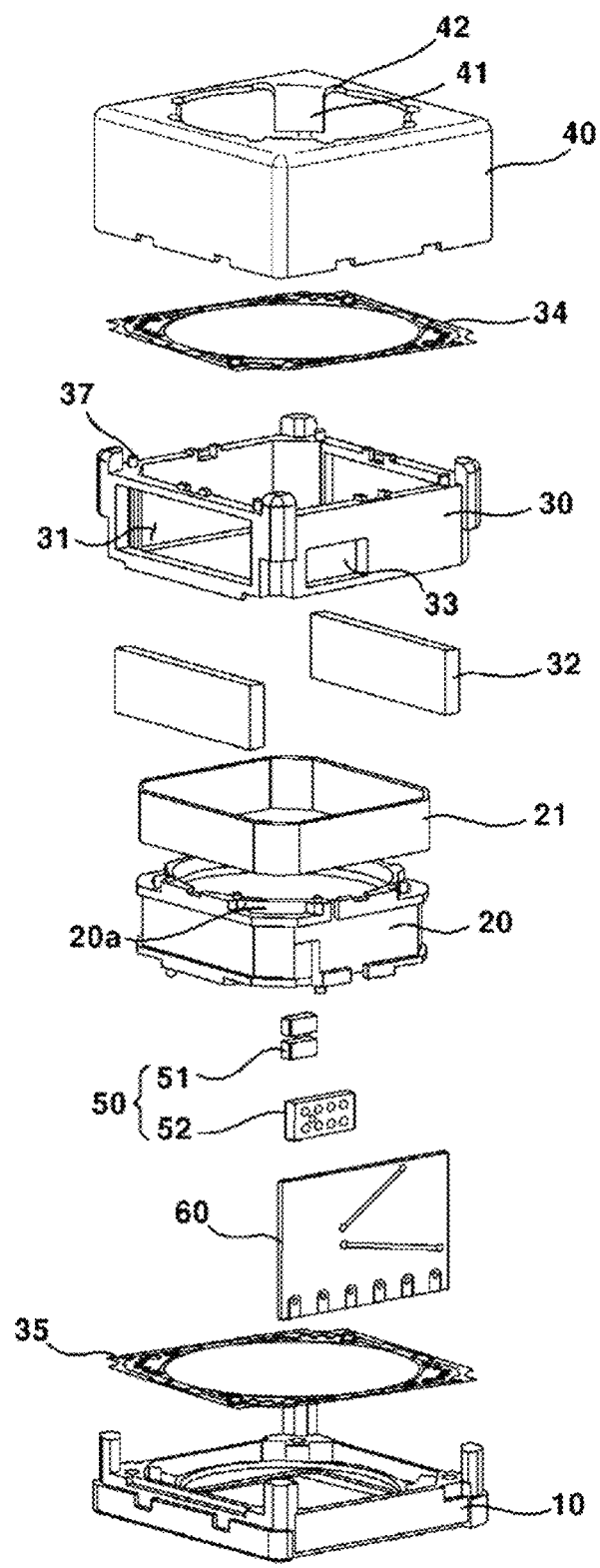
FIG. 1 is an exploded perspective view illustrating a camera module according to an exemplary embodiment.

Hereinafter, exemplary embodiments of the present disclosure will be described with reference to the exemplary drawings. In designating elements in the drawings as reference numerals, wherever possible, the same reference numerals are used to refer to the same element, even though the same elements are illustrated in different drawings. In addition, in describing exemplary embodiments of the present disclosure, when it is determined that a detailed description about known function or structure relating to the present disclosure may disturb understanding of exemplary embodiments of the present disclosure, the detailed description may be omitted.

In addition, in describing elements of exemplary embodiments of the present disclosure, the terms such as "first", "second" "A", "B", "(a)" and "(b)" may be used. However, such terms are used merely to distinguish a particular element from another element, and therefore, essence, order or sequence of the relevant elements shall not be limited by the terms. It will be understood that when an element is referred to as being "connected", "contacted" or "coupled" to another element, it can be directly connected, contacted or coupled to the other elements, or otherwise, an intervening elements may be "connected", "contacted" or "coupled" between the element and the other element.

As used herein, the term "optical axis direction" is defined as a direction of an optical axis of a lens module installed at a lens actuator. Meanwhile, the term "optical axis direction" may be used in combination with the terms such as "up/down direction", "z-axis direction", etc.

As used herein, the term "auto focus function" is defined as a function to focus on the subject by moving the lens module in the optical axis direction according to distance to the subject to adjust the distance between an image sensor and the subject, in order to form a clear image on the image sensor. Meanwhile, the term "auto focus" may be used in combination with the term "AF (Auto Focus)".

As used herein, the term "handshake compensation function" is defined as a function to move or tilt the camera module in a direction perpendicular to the optical axis direction so as to counterbalance trembling (motion) generated by the image sensor due to external force. Meanwhile, the term "handshake compensation" may be used in combination with the term "OIS (Optical Image Stabilization)".

Hereinafter, exemplary embodiments will be described with reference to enclosed drawings.

Figure 2:
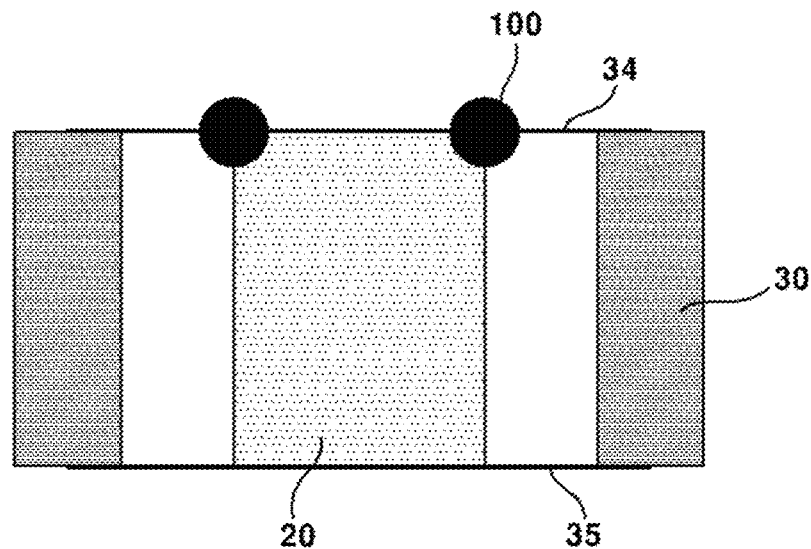
FIGS. 2 and 3 are schematic views illustrating operated states of a camera module according to an exemplary embodiment.
Figure 3:
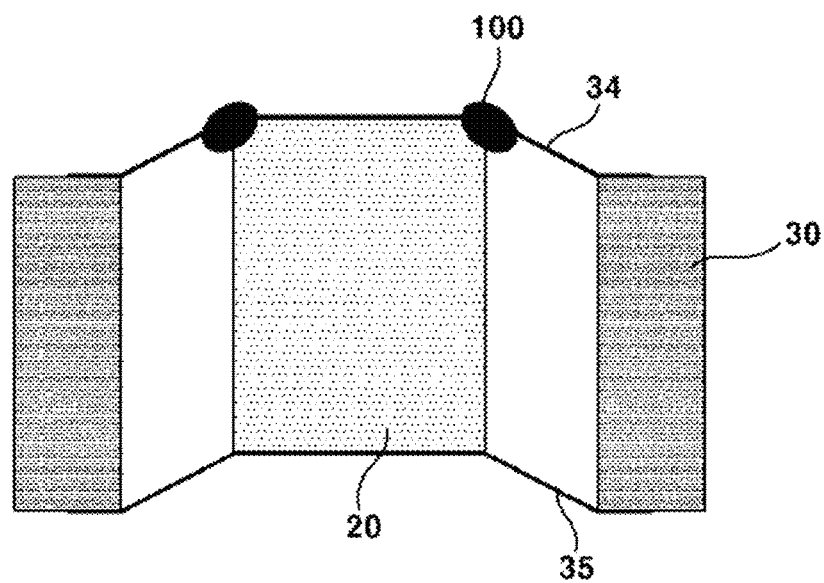
Figure 4:
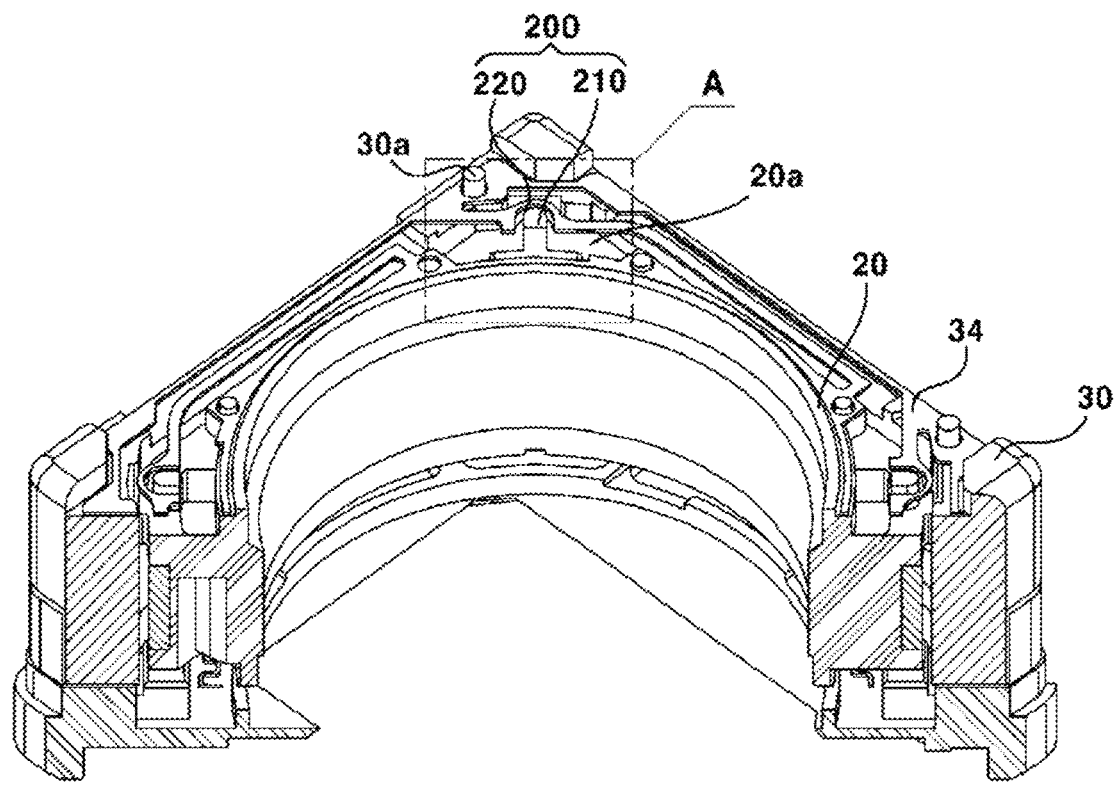
FIG. 4 is a partial cutaway perspective view of FIG. 1.
Figure 5:
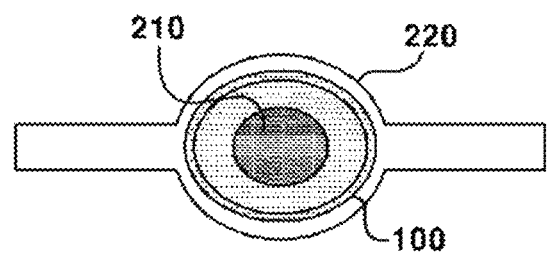
FIG. 5 is a schematic view illustrating structures of a damping member and a support unit according to a first exemplary embodiment.
Figure 6:
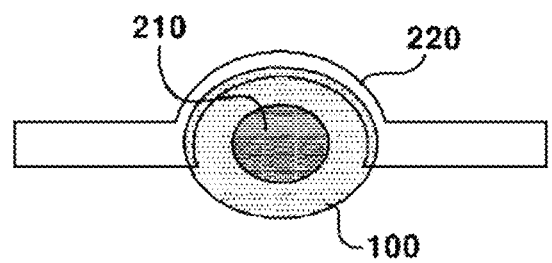
FIG. 6 is a schematic view illustrating structures of a damping member and a support unit according to a second exemplary embodiment.
Figure 7:
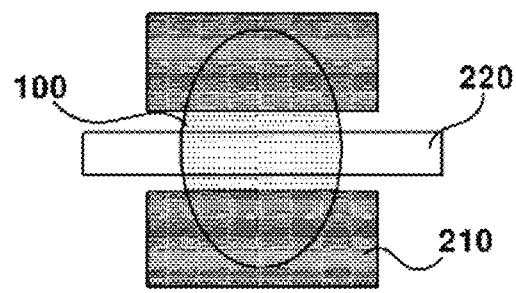
FIG. 7 is a schematic view illustrating structures of a damping member and a support unit according to a third exemplary embodiment.
Figure 8:
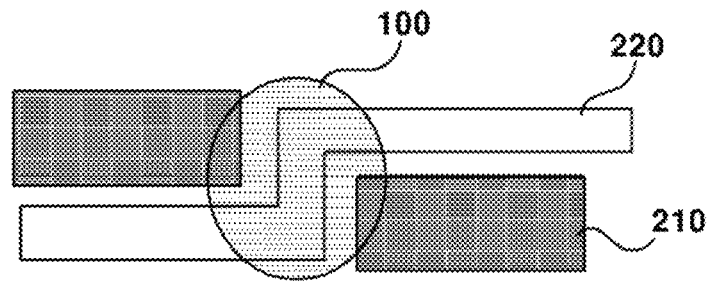
FIG. 8 is a schematic view illustrating structures of a damping member and a support unit according to a fourth exemplary embodiment.

FIG. 1 is an exploded perspective view illustrating a camera module according to an exemplary embodiment; FIGS. 2 and 3 are schematic views illustrating operated states of a camera module according to an exemplary embodiment; FIG. 4 is a partial cutaway perspective view of FIG. 1; FIG. 5 is a schematic view illustrating structures of a damping member and a support unit according to a first exemplary embodiment; FIG. 6 is a schematic view illustrating structures of a damping member and a support unit according to a second exemplary embodiment; FIG. 7 is a schematic view illustrating structures of a damping member and a support unit according to a third exemplary embodiment; and FIG. 8 is a schematic view illustrating structures of a damping member and a support unit according to a fourth exemplary embodiment.

As illustrated in FIGS. 1 and 2, a lens driving device according to an exemplary embodiment may include a base (10), a bobbin (20), and a cover member (40). The cover member (40) may form an external appearance of a camera module. Alternatively, as illustrated in the figures, a housing (30) supporting a first magnet (32) may be further arranged at an internal side of the cover member (40).

The base (10) may be coupled to the cover member (40).

The bobbin (20) may be installed in an internal space of the cover member (40) to be reciprocatively movable in an optical axis direction. A coil unit (21) may be installed at an outer circumferential surface of the bobbin (20).

A first elastic member (34) and a second elastic member (35) may be installed at an upper portion and a lower portion of the bobbin (20), respectively. One end of the first elastic member (34) may be connected to the bobbin (20) and another end of the first elastic member (34) may be coupled to the housing (30) or to the cover member (40). When the another end of the first elastic member (34) is coupled to the housing (30), the another end of the first elastic member (34) may be coupled to an upper surface of the housing (30) or to an internal surface of the cover member (40). One end of the second elastic member (35) may be connected to the bobbin (20) and another end of the second elastic member (35) may be coupled to an upper surface of the base (10) or to a lower surface of the housing (30). In addition, a protrusion to be coupled with the second elastic member (35) may be formed on an upper surface of the base (10). A hole or a recess may be formed on the second elastic member (35) at a position corresponding to that of the protrusion on the base (10), such that the second elastic member (35) can be fixed by coupling of the protrusion and the hole or recess and inhibited from being rotated. In addition, an adhesive may be introduced in order for concrete fixation.

Meanwhile, as illustrated in FIGS. 1 and 2, the first elastic member (34) may be formed as a single body. The second elastic member (35) may be provided as two springs in a two-sectional structure, such that the second elastic member (35) can function as a terminal to be applied with current. That is, the current applied through the terminal (not illustrated) delivered through two springs of the second elastic member (35), and the delivered current may be applied to the coil unit (31) wound on the bobbin (20). To this end, the second elastic member (35) and the coil unit (21) may be conductively connected using a method such as soldering, respectively. That is, both distal ends of the two springs and the coil unit (21) may be electrically connected using means such as soldering, Ag epoxy, welding, conductive epoxy, etc. However, the present disclosure is not limited hereto. Otherwise, in a reverse way, the first elastic member (34) may be formed in a two-sectional structure, and the second elastic member (35) may be formed in a single body.

A bidirectional movement in an optical axis direction by the bobbin (20) may be supported by the first and the second elastic member (34, 35). That is, the bobbin (20) may be spaced from the base (10) at a predetermined distance such that the bobbin (20) can be controlled to move upward and downward with an initial position of the bobbin (20) as a center. In addition, the initial position of the bobbin (20) may be an upper surface of the base (10), such that bobbin (20) can be controlled to move only upward with an initial position of the bobbin (30) as a center.

Meanwhile, the coil unit (21) may be provided as a coil block in a shape of ring coupled to an outer circumferential surface of the bobbin (20), but not limited hereto. That is, a coil may be directly wound on an outer circumferential surface of the bobbin (20) to form the coil unit (21). As illustrated in FIG. 3, the coil unit (21) may be installed at a position near to a lower surface of the bobbin (20), and may include a straight surface and a curved surface according to a shape of the bobbin (20).

Alternatively, the coil unit (21) formed as a coil block may be in an angular shape, and may be in an octagonal shape. That is, the coil unit (21) may be all formed of straight surfaces with no curved surface. This is by consideration of electromagnetic interaction with the first magnet (32) disposed oppositely. That is, the electromagnetic force may be maximized when both surfaces of the first magnet (32) and the coil unit (21) opposing to each other are flat surfaces. However, the present disclosure is not limited hereto. The surfaces of the first magnet (32) and the coil unit (21) may be formed as all curved surfaces, all flat surfaces, or one as curved surfaces and the other as flat surfaces, according to its design specification.

In addition, the bobbin (20) may include a first surface flatly formed on a surface responding to the straight surface of the coil unit (21) and a second surface roundly formed on a surface responding to the curved surface of the coil unit (21), such that the coil unit (21) can be coupled to an outer circumferential surface of the bobbin (20), but not limited hereto. That is, the second surface may be also formed as a flat surface.

The housing (30) may be formed as a frame roughly in a shape of hexahedron. Coupling structures for the upper and the lower elastic member (34, 35) to be coupled may be provide on an upper and a lower surface of the housing (30), respectively. A first magnet (32) may be installed at a lateral surface of the housing (30). Here, a first magnet accommodation portion (31) may be formed as illustrated in FIG. 2. The first magnet (32) may be arranged at the first magnet accommodation portion (31) to be fixed at the cover member (40). However, the present disclosure is not limited hereto. That is, the first magnet (32) may be adhesively fixed directly to an inner circumferential surface of the housing (30) without the first magnet accommodation portion (31). The first magnet (32) may be fixed by bonding on a lateral surface or on an edge of the housing (30), when the first magnet (32) is directly fixed to the housing (30) in such way as described in the above.

In addition, the housing (30) may further include a penetration hole (33) as well as the first magnet accommodation portion (31). As illustrated in the figures, a pair of the penetration holes (33) may be formed to face each other, but not limited hereto. Alternatively, the pair of the penetration holes (33) may be formed to face each other with the optical axis as a center. That is, the penetration hole (33) may be formed in a size larger than the size of the second magnet (51), on a surface of the housing (30) to face the second magnet (51). Here, the penetration hole (33) may be formed in a rectangular shape, or may be formed in a circular or polygonal shape. Alternatively, the housing (30) having four first magnet accommodation portions (31) may be used, such that the first magnet (32) can be installed at two of the first magnet accommodation portions (31) and the rest of two first magnet accommodation portions (31) can be used as the penetration holes (33).

Alternatively, the lens driving device may include only a cover member (40), without including a separate housing (30). The cover member (40) may be formed of a metallic material that is a ferromagnetic substance such as iron. In addition, the cover member (40) may be provided in an angular shape when viewed from the above, so as to cover a whole of the bobbin (20). Here, the cover member (40) may be in a rectangular shape as illustrated in FIG. 1. Otherwise, although it is not illustrated in the drawings, the cover member (40) may be provided in an octagonal shape. In addition, in a case where the cover member (40) is in an octagonal shape when viewed from the above, if the shape of the first magnets (32) arranged at edges of the housing (30) is a trapezoid shape when viewed from the above, then the magnetic field emitted from edges of the housing (30) can be minimized.

The cover member (40) may be integrally formed with a plurality of inner yokes (41) formed at a position corresponding to that of the plurality of accommodation grooves (20a). According to an exemplary embodiment, one side surface of the inner yoke (41) may be spaced from the coil unit (21) at a predetermined distance, and another side surface of the inner yoke (41) may be spaced from the bobbin (20) at a predetermined distance. In addition, the inner yoke (41) may be formed at four edge portions of the housing (30), respectively.

The inner yoke (41) may be formed by being curved from an upper surface of the cover member (40) to an internal side in a direction parallel to the optical axis. Although it is not illustrated, the inner yoke (41) may include an escape groove (42) formed at a position adjacent to that of the curved portion. Such escape groove (42) may formed in a pair or in symmetry. The curved portion where the escape groove (42) is formed may form a bottleneck section. The interference between the inner yoke (41) and the bobbin (20) that may occur during the bobbin (20) is being driven upward and downward can be minimized, by the bottleneck section where the escape groove (110) is formed.

That is, the bobbin (20) may be inhibited from partially damaged by interference of edge portion of the inner yoke (41) when the bobbin (20) is moved upward. A distal end of the inner yoke (41) is required to be arranged by being spaced apart from a bottom surface of the accommodation groove (20a) at a reference position. This is in order to inhibit the distal end of the inner yoke (41) and the bottom surface of the accommodation groove (20a) from contacting or interfering with each other, when the bobbin (20) reaches at the top position during reciprocative movement. In addition, the distal end of the inner yoke (41) may function as a stopper to restrict the movement range of the bobbin (20) within the range defined by design specification. In addition, when a separate housing (30) is not present, the first magnet (32) may be fixed by bonding at a lateral surface or an edge of the cover member (40). In addition, the magnetizing direction of the first magnet (32) may be a direction facing the bobbin (20) and a direction facing the cover member (40), but not limited hereto. The magnetizing direction may vary according to the design specification.

Meanwhile, the lens driving device according to an exemplary embodiment may include a position detection unit (50) configured to detect motion of the bobbin (20).

The position detection unit (50) may include a second magnet (51) and a position detection sensor (52). Here, the position detection sensor (52) may be installed at the circuit board (60).

The second magnet (51) may be formed smaller and thinner than the first magnet (32). As illustrated in the figures, the second magnet (51) may be formed in a square shape, but not limited hereto. The second magnet (51) may be formed in a variety of shapes such as rectangle, triangle, polygon, circle, etc.

The second magnet (51) may be installed at an outer circumferential surface of the bobbin (20). According to an exemplary embodiment, the second magnet (51) may be fixed in a second magnet accommodation portion formed at the bobbin (20) using such as adhesive, glue, etc. Here, the second magnet accommodation portion may include a guide in shape of a rib protruded from an outer circumferential surface of the bobbin (20), but not limited hereto. Alternatively, a grooved portion at which the second magnet (51) is to be arranged may be formed at the bobbin (20).

The second magnet (51) may be arranged at a position not interfering with the coil unit (21). That is, when the coil unit (21) is installed on a circumferential surface of the bobbin (20) as illustrated in FIG. 1, the second magnet (51) may be arranged at a lower portion of the bobbin (20), or vice versa. This is in order to so locate the coil unit (21) as not to affect ascending/descending operations of the bobbin (20) in the optical axis direction. However, the second magnet (51) may also be arranged between the coil unit (21) and the bobbin (20). Alternatively, the second magnet (51) may be arranged at an upper surface or an upper side of the coil unit (21) facing the cover member (40) or the housing (30).

The second magnet (51) may be so arranged as not to face the first magnet (32), as illustrated in FIG. 1. That is, two of the first magnets (32) may be provided as a pair to face and be parallel to each other. Here, the second magnet (51) may not be installed at a position facing the two surfaces at which the first magnets (32) are installed, in a case where the housing (30) is in a rectangular shape. The reason of such arrangement of the second magnet (51) as not to face the first magnet (32) is, in order to inhibit interference between magnetic force change of the second magnet (51) and magnetic force of the first magnet (32), for the position detection sensor (52) to accurately detect motions of the bobbin (20) as feedback. In addition, the second magnet (51) may be arranged at an upper portion or a lower portion of the first magnet (32), while not facing the first magnet (32). In such case, four of the first magnets (32) may be respectively arranged at four edges of the housing (30).

In addition, the second magnet (51) may be polarized into an upper and a lower portion. Thereby, the position detection sensor (52) may detect ascending/descending operations of the second magnet (100), and may accurately detect ascending/descending operations of the bobbin (20).

As illustrated in FIG. 1, the circuit board (60) may be arranged in response to each lateral surface of the bobbin (20) and the housing (30) and/or the cover member (40). According to an exemplary embodiment, a cover member (40) may be provided to function as a shield can. The circuit board (60) may be arranged at a lateral surface of the cover member (40) or may contact the cover member (40). In addition, as illustrated in FIG. 1, the circuit board (60) may contact or be fixed at an outer lateral surface or an inner lateral surface of the cover member (40) or the housing (30).

In addition, the circuit board (60) may include a terminal at a distal end thereof, such that the circuit board (60) can be electrically connected to a PCB (not illustrated) having an image sensor mounted thereon. In addition, the coil unit (21) may be electrically and directly connected to the circuit board (60), such that a current can be applied to the coin unit (21) through the circuit board (60). Alternatively, the coil unit (21) may be connected to a lower spring that has been divided in two pieces, and the lower spring may be electrically connected to the circuit board (60), such that the coil unit (21) can be electrically connected to the circuit board (60). using means such as soldering, Ag epoxy, welding, conductive epoxy, etc.

Here, the position detection sensor (52) such as a Hall sensor may be arranged at an internal surface of the circuit board (60). Therefore, the position detection sensor (52) may not be exposed to outside. In addition, the penetration hole (33) formed at the housing (30) may be provided in a shape corresponding to that of the first magnet accommodation portion (31) at which the first magnet (32) is to be installed. Alternatively, the penetration hole (33) may be provided as a penetration hole having width and height larger than those of the second magnet (51). In addition, the circuit board (60) installed with the position detection sensor (52) may be fixed at an inner lateral surface of the cover member (40). In such case, the cover member (40) may not include any window formed thereon. Alternatively, the housing (30) may not be provided. In addition, a center of a sensing portion of the position detection sensor (52) may be aligned to a center of the second magnet (51). In some exemplary embodiments, those centers of the position detection sensor (52) and the second magnet (51) may be identically aligned to each other. Alternatively, those centers may be slightly spaced apart from each other.

According to an exemplary embodiment, time consumed in auto focus operation can be reduced, because the movement of the bobbin (20) in the optical axis direction may be detected as feedback using the second magnet (51).

According to an exemplary embodiment, the bobbin (20) may be operated, while the coil unit (21) is wound on the bobbin (20), the second magnet (51) smaller than the auto-focusing magnet is attached to the bobbin (20), and the position detection sensor (52) configured to detect magnetic force of the second magnet (51) is arranged at a lateral surface of the lens driving device. Thereby, the auto focus function can be performed more precisely and rapidly without concern of degradation in response characteristic.

According to an exemplary embodiment, the center of the position detection sensor (52) and the center of the second magnet (51) may be identically aligned to each other. A center of vertical length (magnetized portions in two) of the second magnet (51) may be aligned to the center of the position detection sensor (52). In addition, the surface the second magnet (51) that faces the position detection sensor (52) may be magnetized in two parts, such that the position detection thereof can be available.

Any sensor capable of detecting positions, such as gyro sensor, angular velocity sensor, acceleration sensor, and photo-reflector, may be used as the position detection sensor (52). Meanwhile, the position detection sensor (52) may be separately installed. Alternatively, a predetermined circuit board (60) may be provided, and the position detection sensor (52) may be mounted on the circuit board (60). Here, the circuit board (60) may be exposed outside of the cover member (40), or may be integrated in the cover member (40) while having the position detection sensor (52) installed thereon. Otherwise, although it is not illustrated, the circuit board (60) may be installed at an internal surface or an edge of the cover member (40). In addition, the current can be supplied through the circuit board (60) to the coil unit (21) wound on the bobbin (20).

As described in the above, the second magnet (51) may be attached at an external surface of the bobbin (20), and the position detection sensor (52) configured to detect magnetic force of the second magnet (51) may be arranged at a lateral surface of the bobbin (20). Thereby, the position of the bobbin (20) may be feedbacked in real-time. Therefore, more rapid and precise auto-focus operation can be performed, in comparison with the conventional lens driving device.

According to an exemplary embodiment, a damping member (100) may be installed at a connecting portion (37, see FIG. 1) between the bobbin (20) and the first elastic member (34).

The damping member (100) may be used for controlling the scrambling phenomenon of the bobbin (20). The damping member (100) may be arranged at the connecting portion (37) between the bobbin (20) equivalent to a driver of the lens driving device and the housing (30) equivalent to a stator of the lens driving device.

According to an exemplary embodiment, the damping member (100) may be installed at a connecting portion between the bobbin (20) equivalent to the driver of the lens driving device and the first elastic member (34). According to an exemplary embodiment, the damping member (100) may be provided as a gel material. Any elastically deformable material including epoxy may be used as the damping member (100).

A support unit (200) may be provided at any one or both of the bobbin (20) and the first elastic member (34), such that the support unit (200) can maintain an arranged position of the damping member (100).

According to an exemplary embodiment, as illustrated in FIGS. 2 through 4, the support unit (200) may include a first support portion (210) and a second support portion (220).

The first support portion (210) may be integrally formed at an upper surface of the bobbin (20). The first support portion (210) may be provided in a shape of a protrusion. In addition, the second support portion (220) may be formed at a position corresponding to that of the first support portion (210) of the first elastic member (34), such that the second support portion (220) may cover a circumference of the first support portion (220).

The first support portion (210) and the second support portion (220) may be formed in a variety of shapes. According to some exemplary embodiments, the shapes of the first support portion (210) and the second support portion (220) may be formed as illustrated in FIGS. 5 through 8, but not limited hereto. Thus, any structure such that the second support portion (220) covers a circumference of the first support portion (210) may be employed.

According to a first exemplary embodiment, the first support portion (210) may be protrusively arranged at a center as illustrated in FIG. 5, and the second support portion (220) may be spaced apart from the first support portion (210) at a predetermined distance, such that the first support portion (210) can be arranged at a center. Here, the second support portion (220) may be provided in a shape of a ring. In addition, the first support portion (210) and the second support portion (220) may be concentrically arranged, such that the damping member (100) may be coated at a center of the first support portion (210) and the second support portion (220) or between the first support portion (210) and the second support portion (220).

According to a second exemplary embodiment, the second support portion (220) may include an opening at one side thereof. That is, as illustrated in FIGS. 3 through 6, the second support portion (220) may be integrally formed with the first elastic member (34), in a shape of an arc not interfering with the first support portion (210), such that damping member (100) may be coated while the first support portion (210) and the second support portion (220) are symmetrically arranged.

According to a third exemplary embodiment, the first support portion (210) may be formed as a pair of protrusions as illustrated in FIG. 7. These protrusions may be spaced apart from each other at a predetermined distance to form a concaved groove in a shape of a slit. In addition, the second support portion (220) may be provided in straight shape, such that the second support portion (220) can pass through the concaved groove. In addition, the damping member (100) may be coated such that the damping member (100) can contact both of the first support portion (210) and the second support portion (220).

According to a fourth exemplary embodiment, the first support portion (210) may be formed as a pair of protrusions as illustrated in FIG. 7. These protrusions may be spaced apart from each other at a predetermined distance, while these protrusion are arranged mismatched so as not to face each other and forming an L-shaped gap. In addition, the second support portion (220) may be curved at least twice, such that the second support portion (220) can pass through the gap. In addition, the damping member (100) may be coated such that the damping member (100) can contact both of the first support portion (210) and the second support portion (220).

As described in the above, when the damping member (100) is coated through the support unit (200), the amount of increasing damping member (100) may decrease less than half in comparison with the conventional lens driving device. Thereby, damage in the damping member (100) can be minimized.

According to an exemplary embodiment, the damping member (100) may be coated at a connecting portion of the bobbin (20) and the first elastic member (34) through the support unit (200). Thereby, the damping member (100) may be inhibited from permeating into other components such as an inside of the bobbin (20) during the coating process of the damping member (100).

According to an exemplary embodiment, the height of the first support portion (210) in shape of a protrusion formed at the bobbin (20) may be formed the same as or higher than the height of the first elastic member (34). Thereby, flow and driving distance of the damping member (100) can be minimized.

According to an exemplary embodiment, the spring leg of the first elastic member (34) may be formed to be thick in a width direction and long in a length direction. Thereby, the second frequency in left and right width directions can be moved to after 200~300 Hz, while the first frequency is maintained as similar to that of the conventional device. Thus, the device can be controlled more easily.

According to an exemplary embodiment, the lens driving device may preform both the unidirectional control and the bidirectional control.

That is, the base (10) and the bobbin (20) may be arranged by being adhered to each other at an initial position. For example, the base (10) may contact a bottom surface of the bobbin (20) to form an initial position. Alternatively, although it is not illustrated, a stopper may be protrusively formed on a bottom surface of the bobbin (20), such that the stopper may be arranged to contact an upper surface of the base (10). In such case, a predetermined prepress may be applied to the first elastic member (34) and the second elastic member (35), such that the initial position of the bobbin (20) can adhere to the base (10). Thereby, the bobbin (20) may ascend by the electromagnetic interaction, when electric power is applied. On the contrary, the bobbin (20) may return to the initial position by the restoring force of the first elastic member (34) and the second elastic member (35), when the electric power is shut off.

Alternatively, the base (10) and the bobbin (20) may be arranged by being spaced apart from each other at a predetermined distance at the initial position. In such case, the first elastic member (34) and the second elastic member (35) may be formed in a flat shape with no prepress applied. Alternatively, the first elastic member (34) and the second elastic member (35) may be formed with a predetermined prepress applied. In such case, the bobbin (20) may ascend or descend according to the polarity of current, when the electric power is applied in the initial state where the bobbin (20) is spaced from the base (10) at a predetermined distance. That is, the bobbin (20) may ascend from the initial position as a standard, when the normal current is applied. Otherwise, the bobbin (30) may descend from the initial position as a standard, when the reverse current is applied.

As described in the above, according to an exemplary embodiment, the time required for auto-focusing operation can be minimized, because more accurate position of the bobbin (20) can be detected using the second magnet (51), when performing auto-focusing function by controlling the bobbin (20) to ascend or descend. In particular, the correction magnet (200) installed at a side facing the second magnet (51) may offset the attractive force between the second magnet (51) and the cover member (40), such that the bobbin (20) can move while keeping concentric with the cover member (40) as far as possible.

The camera module may include a lens driving device configured as described in the above, a lens barrel coupled to the bobbin (20), an image sensor (not illustrated) and a PCB. Here, the image sensor may be mounted on the PCB. The PCB may form a bottom surface of the camera module.

The bobbin (20) may include a lens barrel. At least one lens may be installed in the lens barrel. The lens barrel may be screw-coupled to an inside of the bobbin (20), but not limited hereto. Although it is not illustrated, the lens barrel may be fixed to an inside of the bobbin (20) by other means than the screw-coupling, or alternatively, one or more lenses may be integrally formed with the bobbin (20) as a single body. The lens may be formed of a single piece, or alternatively, may be formed of two or more lenses composing an optical system.

An infrared cut-off filter may be additionally installed at a position responding to the image sensor on the base (10). The base (10) may be coupled to the housing (30). In addition, the base (10) may support a lower side of the housing (30). A separate terminal member may be installed on the base (10), in order for conductivity with the PCB. The terminal may be integrally formed with the base (10) using such as surface electrodes. Meanwhile, the base (10) may function as a sensor holder to protect the image sensor. In such case, a protrusion may be formed in a downward direction along a lateral surface of the base (10). However, this is not an essential structure. Therefore, although it is not illustrated in the drawings, a separate sensor holder may be arranged at a lower portion of the base (10) to function as the sensor holder.

Hereinafter, some exemplary embodiments will be described with reference to the enclosed drawings.

Figure 9:
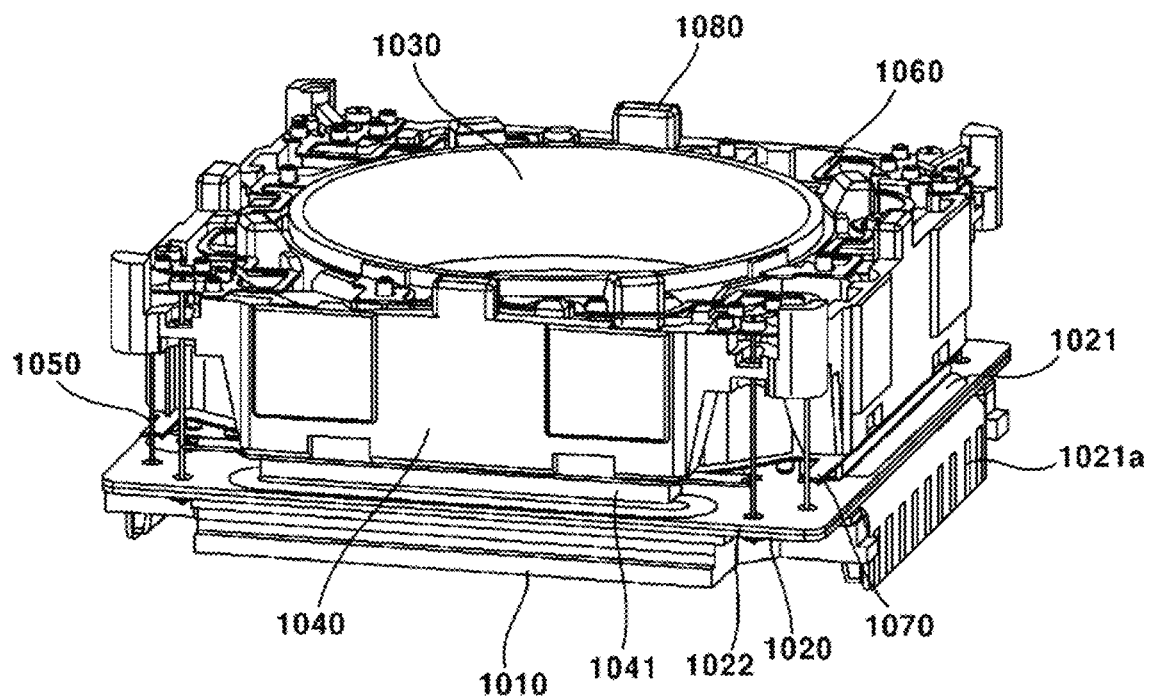
FIG. 9 is a perspective view illustrating a lens driving device according to an exemplary embodiment.
Figure 10:
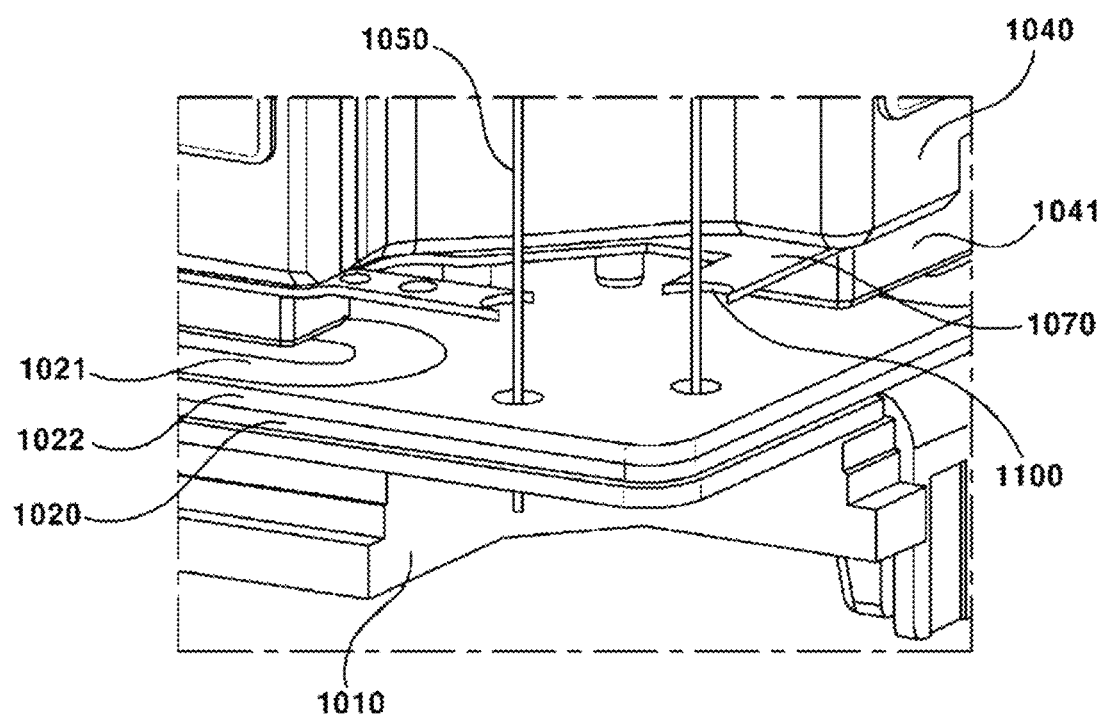
FIG. 10 is a magnified view of FIG. 9.
Figure 11:
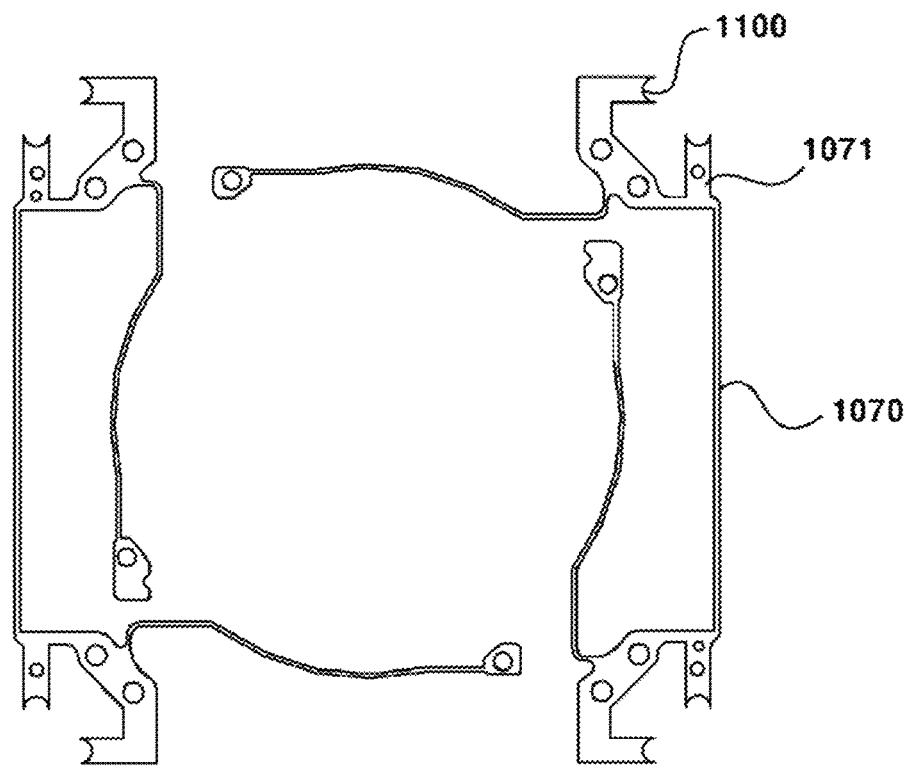
FIG. 11 is a plan view illustrating a lower elastic member according to an exemplary embodiment.
Figure 12:
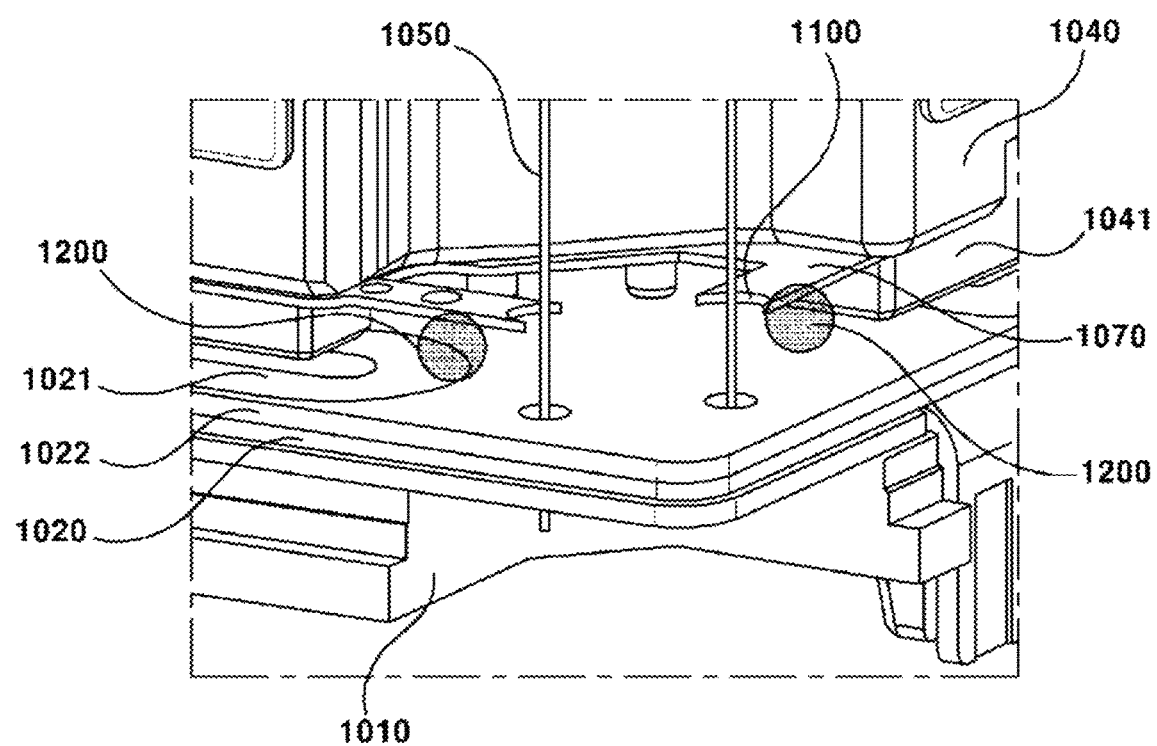
FIGS. 12 and 13 are perspective views illustrating arranged positions of damping member according to first and second exemplary embodiments.
Figure 13:
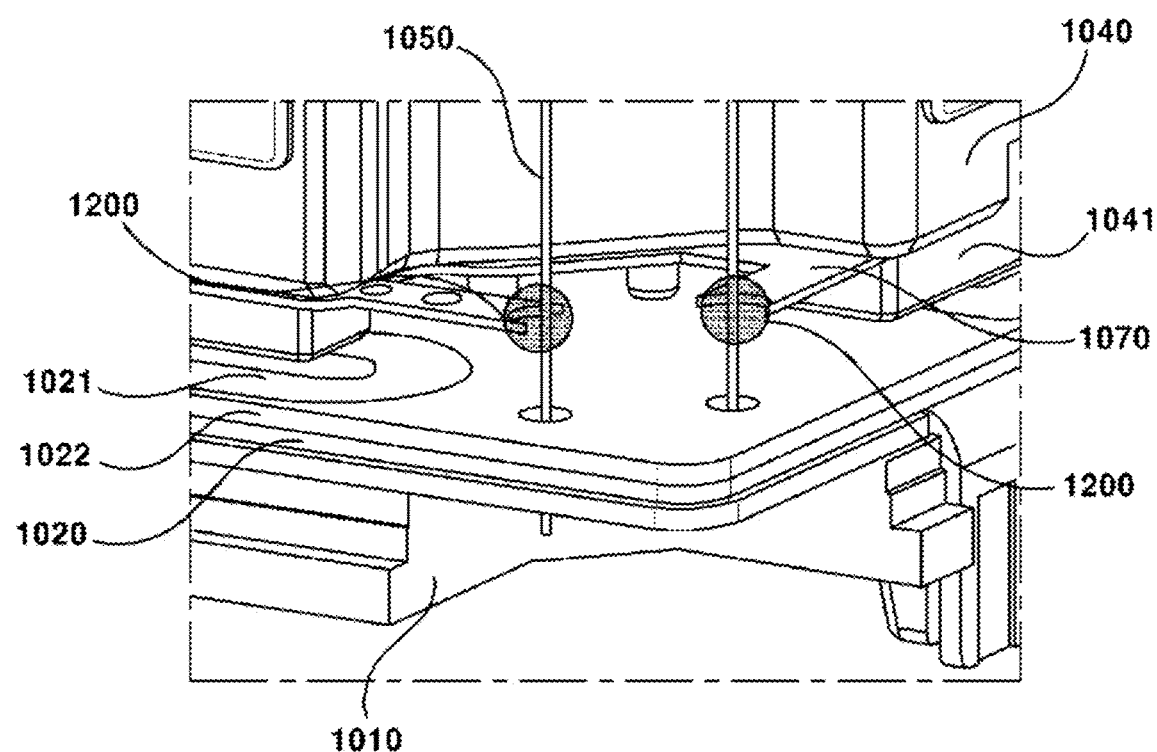
Figure 14A:
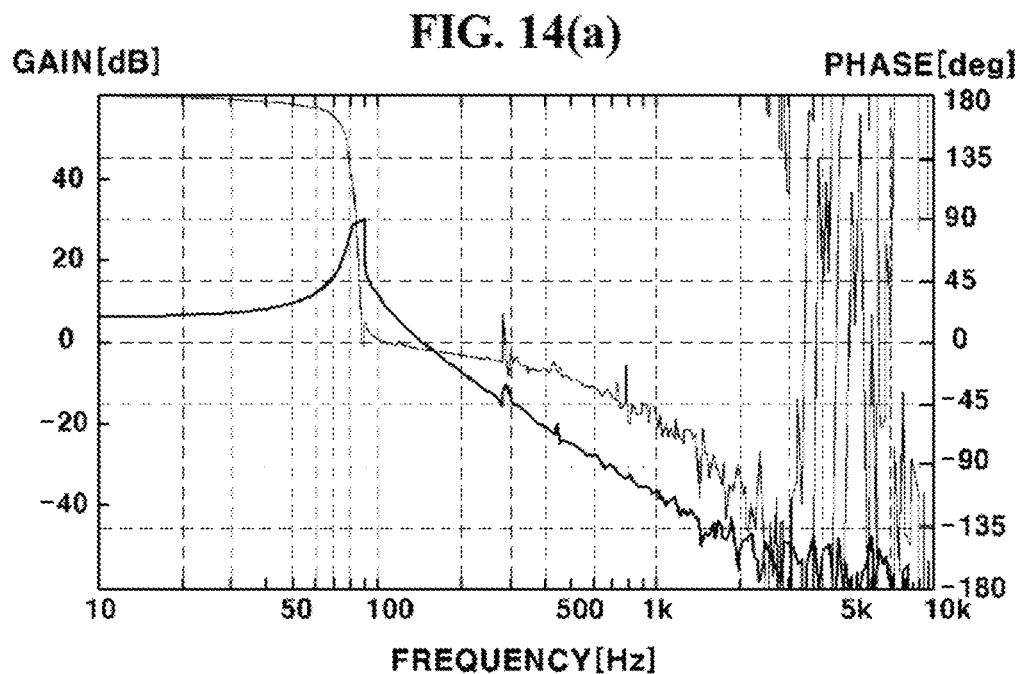
FIGS. 14(a) and 14(b) show graphs illustrating resonance frequency gain change rate before and after applying a damping member according to an exemplary embodiment.
Figure 14B:
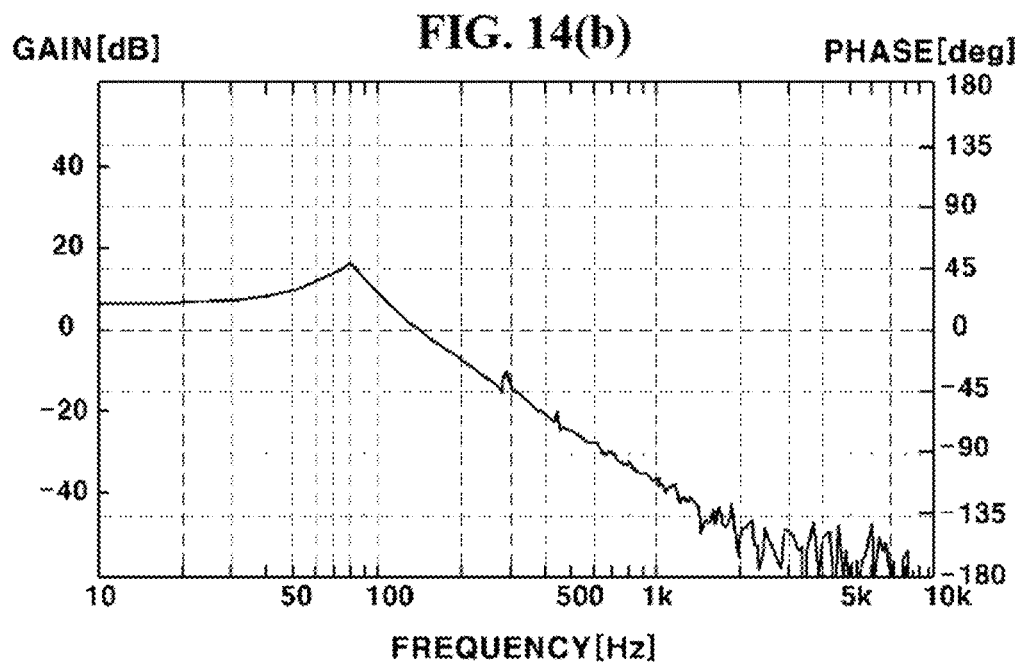

FIG. 9 is a perspective view illustrating a lens driving device according to an exemplary embodiment; FIG. 10 is a magnified view of FIG. 9; FIG. 11 is a plan view illustrating a lower elastic member according to an exemplary embodiment; FIGS. 12 and 13 are perspective views illustrating arranged positions of damping member according to first and second exemplary embodiments; and FIGS. 14(a) and 14(b) show graphs illustrating resonance frequency gain change rate before and after applying a damping member according to an exemplary embodiment.

According to an exemplary embodiment, the lens driving device may include a first lens driving unit and a second lens driving unit. Here, the first lens driving unit may be a lens driving unit for auto-focus function, and the second lens driving unit may be a lens driving unit for handshake compensation function.

The first lens driving unit may include a base (1010), a bobbin (1030), and a holder member (1040).

At least one circuit board (1020) may be installed at an upper surface of the base (1010). A first coil (1021) for driving the second lens driving unit may be installed at the circuit board (1021). The first coil (1021) may be a coil pattern directly formed on the circuit board (1020). Alternatively, the first coil (1021) may be formed on a separate FP coil to be laminated on the circuit board (1020). According to an exemplary embodiment, the first coil (1021) may include a pattern coil. In addition, a cover member may be additionally provided to form an external appearance of the camera module. In addition, as illustrated in FIG. 9, the holder member (1040) supporting a plurality of magnets may be arranged inside of the cover member. In addition, the base (1010) may be coupled to the cover member.

The bobbin (1030) may be installed in an internal space of the cover member, such that the bobbin (1030) can move reciprocatively in an optical axis direction. A second coil may be installed at a coil accommodating portion formed on an outer circumferential surface of the bobbin (1030). The second coil may control the bobbin (1030) to ascend or descend in directions parallel to the optical axis by electromagnetic interaction with the plurality of magnets (1041) to be described hereinafter.

An upper elastic member (1060) and a lower elastic member (1070) may be installed respectively at an upper portion and a lower portion of the bobbin (1030). An end of the upper elastic member (1060) may be connected to the bobbin (1030), and another end of the upper elastic member (1060) may be coupled to the holder member (1040), but not limited hereto. Alternatively, the other end of the upper elastic member (1060) may be coupled to the cover member, as circumstances requires. In a case where the other end of the upper elastic member (1060) is coupled to the holder member (1040), the other end of the upper elastic member (1060) may be coupled to an upper surface or a lower surface of the holder member (1040). An end of the lower elastic member (1070) may be connected to the bobbin (1030), and another end of the lower elastic member (1070) may be coupled to an upper surface of the base (1010), or may be coupled to a lower surface of the holder member (1040). In addition, a protrusion for coupling of the lower elastic member (1070) may be formed on a lower side of the base (1010). A hole or recess may be formed on the lower elastic member (1070), at a position corresponding to the position of the protrusion, such that the lower elastic member (1070) can be fixed by the coupling between the protrusion and the hole or recess. In addition, an adhesive may be additionally used for stronger coupling. Alternatively, the protrusion and the elastic member may be coupled by a method such as thermo-welding process.

Meanwhile, the lower elastic member (1070) may be provided as two leaf springs in a two-sectional structure. The upper elastic member (1060) may be formed as a single body, so as to function as a socket for being applied with current. That is, the current applied through a terminal (1021a) of FIG. 9 may be delivered through the two springs of the lower elastic member (1070), and the delivered current may be applied to the second coil wound on the bobbin (1030). To this end, the lower elastic member (1070) and the second coil may be conductively connected using a method such as soldering, respectively. Here, the lower elastic member (1070) may include an external portion coupled to the holder member (1040), an internal portion coupled to the bobbin (1030), and a connection portion connecting the internal portion and the external portion. The internal portion may be electrically connected to both ends of the second coil using a method such as soldering. That is, both distal ends of the two springs and the second coil may be electrically connected with each other using means such as soldering, Ag epoxy, welding, conductive epoxy, etc. However, the exemplary embodiment is not limited hereto. Alternatively, in a reverse way, the upper elastic member (1060) may be formed in the two-sectional structure, and the lower elastic member (1070) may be formed as a single body. Alternatively, the upper elastic member (1060) may be possibly formed in a four-or more multi-sectional structure.

Bidirectional movements in the optical axis direction by the bobbin (1030) may be supported by the upper elastic member (1060) and the lower elastic member (1070). That is, the bobbin (1030) may be spaced from the holder member (1040) at a predetermined distance, such that the bobbin (1030) can be controlled to ascend and descend from the initial position of the bobbin (1030) as a center. Alternatively, the initial position of the bobbin (1030) may contact an upper portion or a lower portion of the holder member (1040), such that bobbin (1030) can be controlled to move only upward from the initial position of the bobbin (1030) as a center.

FIG. 11 is a plan view illustrating the lower elastic member (1070) according to an exemplary embodiment.

As illustrated in FIG. 11, the lower elastic member (1070) may include at least one fixing piece (1071) formed around four edges of the lower elastic member (1070). The fixing piece (1071) may be provided in a plate shape, and may be provided at each edge of the lower elastic member (1070), while a pair of extending portions are formed at a distal end of the fixing piece (1070) to perpendicular to each other and form an opened portion. Such structure of the opened portion can inhibit interference with the support member (1050).

A concave grooved portion (1100) may be formed at a distal end of the extending portion of the fixing piece (1071). The concave grooved portion (1100) may be provided in a semicircular shape, but not limited hereto. The concave grooved portion (1100) may be formed so as to cover a part or a circumference of the support member (1050), while being spaced apart from the support member (1050) so as not to contact the support member (1050). Alternatively, although it is not illustrated, a penetration hole may be provided instead of the concave grooved portion (1100), such that the support member (1050) can penetrate through the penetration hole to be coupled. Here, a diameter of the penetration hole may be formed comparatively larger than the diameter of the support member (1050), such that the support member (1050) can be spaced apart from an inner circumferential surface of the support member (1050) at a predetermined distance.

Meanwhile, the second coil may be provided as a coil block in a shape of ring coupled to an outer circumferential surface of the bobbin (1030), but not limited hereto. That is, the second coil may be directly wound on an outer circumferential surface of the bobbin (1030). The second coil may be installed at a position near to a lower surface of the bobbin (1030), and may include a straight surface and a curved surface according to a shape of the bobbin (1030).

Alternatively, the second coil formed as a coil block may be in an angular shape, for example, may be in an octagonal shape. That is, the second coil may be all formed of straight surfaces with no curved surface. This is by consideration of electromagnetic interaction with the magnet (1041) disposed oppositely. That is, the electromagnetic force can be maximized, when both surfaces of the magnet (1041) and the second coil facing each other are flat surfaces. However, the exemplary embodiment is not limited hereto. The surfaces of the magnet (1041) and the second coil may be formed as all curved surfaces, all flat surfaces, or one as a curved surface and the other as a flat surface, according to its design specification.

In addition, the bobbin (1030) may include a first surface flatly formed on a surface responding to the straight surface and a second surface roundly formed on a surface responding to the curved surface, such that the second coil can be coupled to an outer circumferential surface of the bobbin (1030), but not limited. That is, the second surface may be also formed as a flat surface.

The holder member (1040) may be formed as a frame roughly in a shape of hexahedron. A penetration hole may be formed at an upper portion and a lower portion of the holder member (1040). A coupling structure for the upper elastic member (1060) and the lower elastic member (1070) to be coupled may be provided on an upper surface and a lower surface of the holder member (1040), respectively. A magnet (1041) may be installed at a bottom surface of four edges or four lateral walls of the holder member (1040). Here, the magnet (1041) may be arranged at a position facing the first coil (1021) to be described hereinafter. According to an exemplary embodiment, the lower elastic member (1070) may be coupled to the holder member (1040), such that a distance from the base (1010) to the magnet (1040) is farther than the distance from the base (1010) to the lower elastic member (1070). That is, the lower elastic member (1070) may be coupled to a lower surface of the holder member (1040), while a distance from the base (1010) to the magnet (1040) is arranged farther than the distance from the base (1010) to the lower elastic member (1070). In such case, the magnet (1040) may be fixed at or coupled to the holder member (1040).

Alternatively, the lens driving device may include only a cover member, without including a separate holder member (1040), when an auto focus unit is provide instead of a handshake compensation unit. The cover member (not illustrated) may be formed of a metallic material that is a ferromagnetic substance such as iron. In addition, the cover member may be provided in an angular shape when viewed from the above, such that the cover member can cover a whole of the bobbin (1030). Here, the cover member may be in a rectangular shape. Alternatively, although it is not illustrated in the drawings, the cover member may be provided in an octagonal shape.

The first lens driving unit may be configured as described in the above. Otherwise, the first lens driving unit may be replaced with an optical system implementing another auto-focusing function than the structure described in the above. That is, the first lens driving unit may be formed of an optical module using a single-lens moving actuator or an actuator of variable reactive index type, instead of using an auto-focusing actuator of VCM type. That is, any kind of optical actuator that is able to perform auto-focusing function may be used in the first lens driving unit.

Meanwhile, the second lens driving unit may be a lens driving unit for handshake compensation function. The second lens driving unit may include a first lens driving unit, a base (1010), a support member (1050), a circuit board (1020), and a damping member (1200).

The base (1010) may be configured as described in the above. A circuit board (1020) may be mounted on an upper surface of the base (1010).

The circuit board (1020) may include a first circuit board at which a position detection sensor is to be installed, and a second circuit board at which the first coil (1021) is to be arranged, but not limited hereto. That is, the first circuit board and the second circuit board may be formed as a single circuit board.

According to an exemplary embodiment, the first circuit board and the second circuit board (1022) may be separately formed, and the second circuit board (1022) may be formed as an FP coil that is a pattern coil. In such case, the second circuit board (1022) installed with the first coil (1021) may be arranged at an upper portion of the first circuit board, and the first circuit board and the second circuit board (1022) may be conductibly fixed with each other by soldering. Here, the circuit board (1020) may be provided as a FPCB (Flexible Printed Circuit Board), and may be installed at an upper surface of the base (1010).

The first coil (1021) may control the whole of the first lens driving unit to move by shifting and/or tilting or horizontally in a direction of a flat surface perpendicular to the optical axis, via an interaction with the magnet (1041). The first coil (1021) may be arranged at a position corresponding to a bottom surface of the magnet (1041), on the circuit board (1020) using a pattern coil method. For example, in a case where the magnet (1041) is installed at each of wall surfaces of the holder member (1040), the first coil (1021) may be arranged at each of surfaces of the circuit board (1020) corresponding to the wall surfaces of the holder member (1040). According to an exemplary embodiment, four of the first coils (1021) may be arranged to face the magnet (1041), but not limited hereto. Alternatively, two or at least twelve pieces of the first coil (1021) may be arranged. In addition, not only a piece, but also two piece of the first coil (1021) may be arranged to face each of the magnet (1041).

In addition, although it is not illustrated, the circuit board (1020) may include at least one position detection sensor installed at a surface facing the base (1010), such that the position detection sensor can detect movements of the holder member (1040) in an X-axis direction (or a first direction) and an Y-axis direction (or a second direction). Here, the first direction and the second direction mean diagonal directions perpendicular to the X-axis direction and the Y-axis direction.

However, the position detection sensor is not limited to be installed at the circuit board (1020). That is, the position detection sensor may be directly arranged or mounted on the base (1010). In such case, a circuit pattern may be formed on a surface of the base (1010) such that the position detection sensor can be electrically connected to the camera circuit board (to be described hereinafter). The position detection sensor may detect magnetic field of the magnet (1041), such that the position detection sensor can detect movement of the holder member (1040) installed with the magnet (1041) in a direction perpendicular to the optical axis.

Meanwhile, the lens driving device according to an exemplary embodiment may include a stopper (1080) arranged at an upper surface of the holder member (1040), in order to minimize the damage of the support member (1050) when an external impact suddenly occurs.

As illustrated in FIG. 9, a plurality of the stopper (1080) may be protrusively formed at an upper surface of the holder member (1040). According to an exemplary embodiment, the stopper (1080) may be arranged roughly around a center of each surface of the holder member (1040), but not limited hereto. Two pieces of the stoppers (1080) may be arranged at each of the surfaces of the holder member (1040), as circumstances require. According to an exemplary embodiment, the stopper (1080) may be provided in a hexahedral shape. An upper surface of the stopper (1080) may be flatly formed.

The support member (1050) may be formed as a wire member. Two pieces of the support member (1050) may be installed at each of edges of the holder member (1040) and the circuit board (1020), respectively. An end of the support member (1050) may be coupled to an external portion of the upper elastic member, and another end of the support portion (1050) may be coupled to the second circuit board (1022) or the circuit board (1020) or the base (1010). Combinations thereof are also possible as occasion demands.

In addition, in a case where the other end of the support portion (1050) is coupled or electrically connected or soldered to the second circuit board (1022), the second circuit board (1022) may not include a separate hole formed thereon. Meanwhile, the upper elastic member to which the support member (1050) is connected may be provided in two-sectional structure, such that the upper elastic member can be supplied with electric power through the support member (1050) and perform auto-focus operation. Here, the support member (1050) may be electrically connected to the circuit board (1020) and the second circuit board (1022). Alternatively, the support member (1050) may be electrically connected to the PCB (not illustrated) to supply the auto-focus unit with electric power.

As illustrated in FIGS. 12 and 13, the damping member (1200) may be coated around an edge of the lower elastic member (1070) to be exposed around an edge of the holder member (1040). Here, the damping member (1200) may be coated symmetrically at each edge of the circuit board (1020) and the holder member (1040). According to an exemplary embodiment, eight pieces of the support member (1050) may be provided, and the damping member (1200) may be coated symmetrically at respective two positions around each of four edges. Alternatively, four pieces of the support member (1050) may be provided, and the damping member (1200) may be coated symmetrically at respective one position around each of four edges. Otherwise, eight pieces of the support member (1050) may be provided, and the damping member (1200) may be coated symmetrically at respective one position around each of four edges. In addition, although it is not illustrated, the damping member (1200) may be coated at the upper elastic member (1060).

According to a first exemplary embodiment, as illustrated in FIG. 12, the damping member (1200) may be so coated as not to interfere with the support member (1050). Here, one end of the damping member (1200) may contact a bottom surface of the fixing piece (1071) of the lower elastic member (1070), and another end of the damping member (1200) may contact an upper surface of the circuit board (1020) and/or the base (1010). Here, the support member (1050) may be spaced apart from the damping member (1200) at a predetermined distance. To this end, a concave grooved portion (1100) may be formed at the fixing piece (1071), at an opened portion facing the support member (1050). Meanwhile, although it is not illustrated in the drawings, the concave grooved portion (1100) may be provided in shape of a penetration hole. In such case, the support member (1050) may be so arranged as to penetrate through the penetration hole.

Alternatively, the fixing piece (1071) may not form the concave grooved portion (1100). In addition, the separation distance between the fixing piece (1071) and the support member (1050) may be separated enough to exclude interference with the support member (1050). In addition, the separation distance between the fixing piece (1071) and the second circuit board (1022) arranged with the first coil (1021) may be formed within the range of 0.08 mm~5 mm. Alternatively, such separation distance may be formed within the range of 0.1 mm~0.4 mm or 0.2 mm~0.3 mm. The operation time may become longer due to delay in moving time of the holder member (1040) by the damping member (1200), when the separation distance is shorter than 0.08 mm. When the separation distance is longer than 5 mm, movement of the holder member (1040) and amount control of the damping member (1200) may be become difficult, and thereby the damping effect may be greatly degraded. According to an exemplary embodiment, the vertical distance between the magnet and the second circuit board (1022) arranged with the first coil (1021) may be within the range of 0.03 mm~4.95 mm. According to an exemplary embodiment, the separation distance between the fixing piece (1071) and the second circuit board (1022) arranged with the first coil (1021) may be formed longer than the vertical distance between the magnet and the second circuit board (1022) arranged with the first coil (1021).

As described in the above, according to an exemplary embodiment, the gain control can be performed more easily during the feedback control, because the damper distribution control is favorably performed when the damping member (1200) is coated between the magnet and the fixing portion.

According to an exemplary embodiment, the lower elastic member (1070) may be arranged at an upper side of the magnet (1041), and the magnet (1041) may be protruded downward with respect to the holder member (1040). In addition, the lower elastic member (1070) may contact or be arranged at a lower side of the holder member (1040), such that the damping member (1200) may be coated at a space exposed between the holder member (1040) and the base (1010). Thereby, working property of the damping member (1200) can be improved. In particular, during the hardening process using ultraviolet rays, the ultraviolet rays can be supplied to the damping member (1200) sufficiently to inhibit the hardening degradation.

According to an exemplary embodiment, intervals between the components are small, such that changes in damper property or damper amount of the damping member (1200) may rarely occur. Thereby, scramble phenomenon of resonant frequency (first, second, third, and fourth resonant frequency) due to decrease in damper amount can be inhibited.

According to an exemplary embodiment, the damping member (1200) may be coated at a narrow space, such that displacement of the handshake compensation unit is similar to that of the damping member (1200). Therefore, the possibility of deformation of the damping member (1200) is very rare.

According to a second exemplary embodiment, the damping member (1200) may be so coated as to connect the support member (1050) and the lower elastic member (1070). That is, the damping member (1200) may be coated at both of the concave grooved portion (1100) and the support member (1050) to connect the lower elastic member (1070) to the support member (1050).

Meanwhile, commonly in both of the first and the second exemplary embodiments, eight pieces of the support member (1050) may be provided, and the damping member (1200) may be coated symmetrically at respective two positions around each of four edges. Alternatively, four pieces of the support member (1050) may be provided, and the damping member (1200) may be coated symmetrically at respective one position around each of four edges. Otherwise, eight pieces of the support member (1050) may be provided, and the damping member (1200) may be coated symmetrically at respective one position around each of four edges.

The resonance component in frequency can be suppressed via such structure according to an exemplary embodiment. The first and the second exemplary embodiments are independent of each other. That is, only one of the first and the second exemplary embodiments may be implemented separately, or both of the first and the second exemplary embodiments may be simultaneously implemented.

Meanwhile, although it is not illustrated in the drawings, according to another exemplary embodiment, the damping member (1200) may be coated independently of the lower elastic member (1070) using a separate structure such as a leaf spring, plate member, or yoke. For example, in the second exemplary embodiment, the support member (1050) and the damping member (1200) may be coated using a separate structure such as a leaf spring, plate member, or yoke, instead of using the lower elastic member (1070).

Alternatively, in still another exemplary embodiment, some part of the holder member (1040) may be shaped similar to the shape of the fixing piece (1071) of the lower elastic member (1070), and the damping member (1200) may be coated between the holder member (1040) and the support member (1050). In such case, the rest of structure may be configured as the same as that of the conventional lens driving device.

The damping member (1200) may be arranged at a lower side of the holder member (1040) and the support member (1050). The damping member (1200) may be coated at a position spaced apart from an end of the support member (1050) at a predetermined distance.

FIGS. 14(*a*) and 14(*b*) show graphs illustrating resonance frequency gain change rate before and after applying a damping member according to an exemplary embodiment.

As illustrated in those graphs, it can be ascertained that peaks due to trembling occur in graph (a) of FIG. 14, which illustrates a frequency analysis in a case where the damping member (1200) according to an exemplary embodiment is not used. However, in graph (b) of FIG. 14, it can be ascertained that the peaks decrease in the curve and occurrence of second and third resonant frequency is suppressed, when the damping member (1200) according to an exemplary embodiment is employed.

According to such structure, the conventional problems, such as lack of the gap at which the damping member (1200) is to be coated and increasing distribution by products due to failure in controlling coated amount of the damping member (1200), can be remedied.

In particular, the damping member (1200) may be coated at the fixing piece (1071) of the lower elastic member (1070), such that the working process can be performed on an exposed surface of the lens driving device. Therefore, the workability can be enhanced. That is, the fixing piece (1071) may be protruded toward an outside of the edge portion of the lower elastic member (1070) and/or the holder member (1040), and the damping member (1200) may be coated between the lower elastic member (1070) and an upper surface of the base (1010) and/or the circuit board (1020). Thereby, damper effect of the damping member (1200) can be improved, and distribution control of the damping member (1200) can be performed more easily and conveniently.

Alternatively, the damping member (1200) may be coated between the fixing piece (1071) of the lower elastic member (1070) and the support member (1050). Thereby, damper effect of the damping member (1200) can be improved, and distribution control of the damping member (1200) can be performed more easily and conveniently.

According to an exemplary embodiment, the gain may be suppressed or Q-value may be lowered to stabilize phase shift, via additional introduction of the damping member. Therefore, the instability of feedback control, caused by rapid phase shift when the change of the gain is rapid in resonant frequency, can be improved. In addition, the peak reduction of resonant frequency and second, third, and fourth resonant frequency can be suppressed.

Meanwhile, in the lens driving device configured as in the above, the base (1010) and the bobbin (1030) may be arranged by being spaced apart from each other at a predetermined distance at the initial position. In such case, the upper elastic member and the lower elastic member may be formed in a flat shape with no prepress applied. Alternatively, the upper elastic member and the lower elastic member may be formed with a predetermined prepress applied. In such case, the bobbin (1030) may ascend or descend according to the direction of current, when the electric power is applied in the initial state where the bobbin (1030) is spaced from the base (1010) at a predetermined distance. That is, the bobbin (1030) may ascend from the initial position as a standard, when the normal current is applied. Otherwise, the bobbin (1030) may descend from the initial position as a standard, when the reverse current is applied.

As described in the above, according to an exemplary embodiment, time required for auto-focus operation can be minimized, because more accurate position of the bobbin (1030) can be detected using the sensing magnet, when performing the auto-focus function by controlling the bobbin (1030) to ascend or descend.

The camera module may include a lens driving device configured as described in the above, a lens barrel coupled to the bobbin (1030), an image sensor (not illustrated) and a PCB. Here, the image sensor may be mounted on the PCB. The PCB may form a bottom surface of the camera module.

The bobbin (1030) may include a lens barrel. At least one lens may be installed in the lens barrel. The lens barrel may be screw-coupled to an inside of the bobbin (1030), but not limited hereto. Although it is not illustrated, the lens barrel may be fixed to an inside of the bobbin (1030) by other means than the screw-coupling, or alternatively, one or more lenses may be integrally formed with the bobbin (1030) as a single body. The lens may be formed of a single piece, or alternatively, may be formed of two or more lenses composing an optical system.

An infrared cut-off filter may be additionally installed at a position responding to the image sensor on the base (1010). The base (1010) may be coupled to the holder member (1040). In addition, the base (1010) may support a lower side of the holder member (1040). A separate terminal member may be installed on the base (1010), in order for conductivity with the PCB. The terminal may be integrally formed with the base (1010) using such as surface electrodes.

Meanwhile, the base (1010) may function as a sensor holder to protect the image sensor. In such case, a protrusion may be formed in a downward direction along a lateral surface of the base (1010). However, this is not an essential structure. Therefore, although it is not illustrated in the drawings, a separate sensor holder may be arranged at a lower portion of the base (1010) to function as the sensor holder.

Hereinafter, an exemplary embodiment will be described with reference to enclosed drawings.

Figure 15:
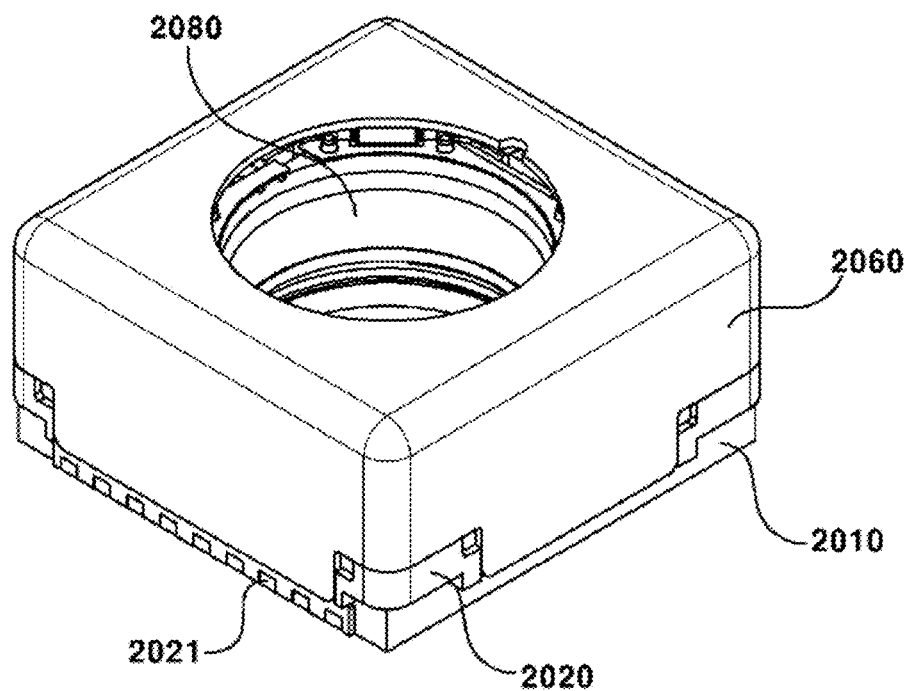
FIG. 15 is a schematic perspective view illustrating a camera module according to an exemplary embodiment.
Figure 16:
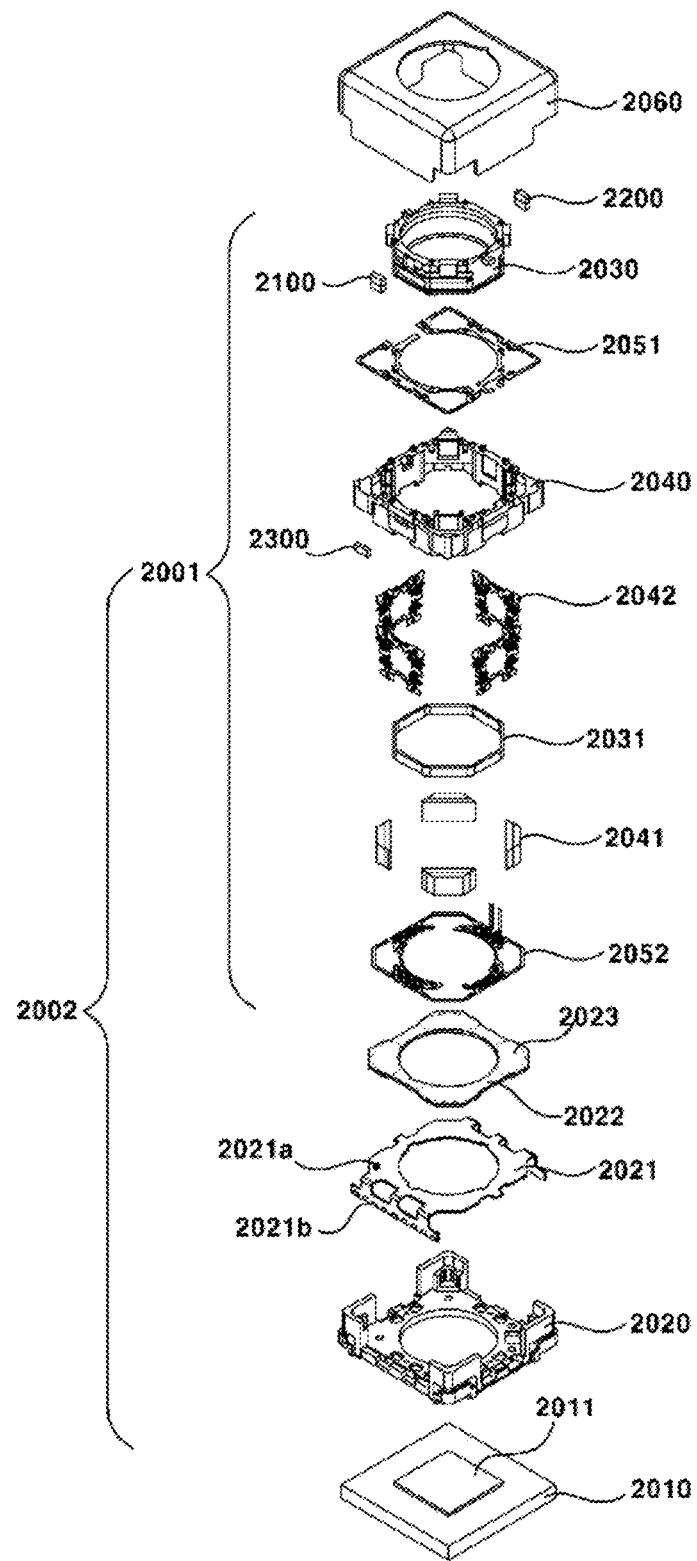
FIG. 16 is an exploded perspective view of FIG. 15.
Figure 17:
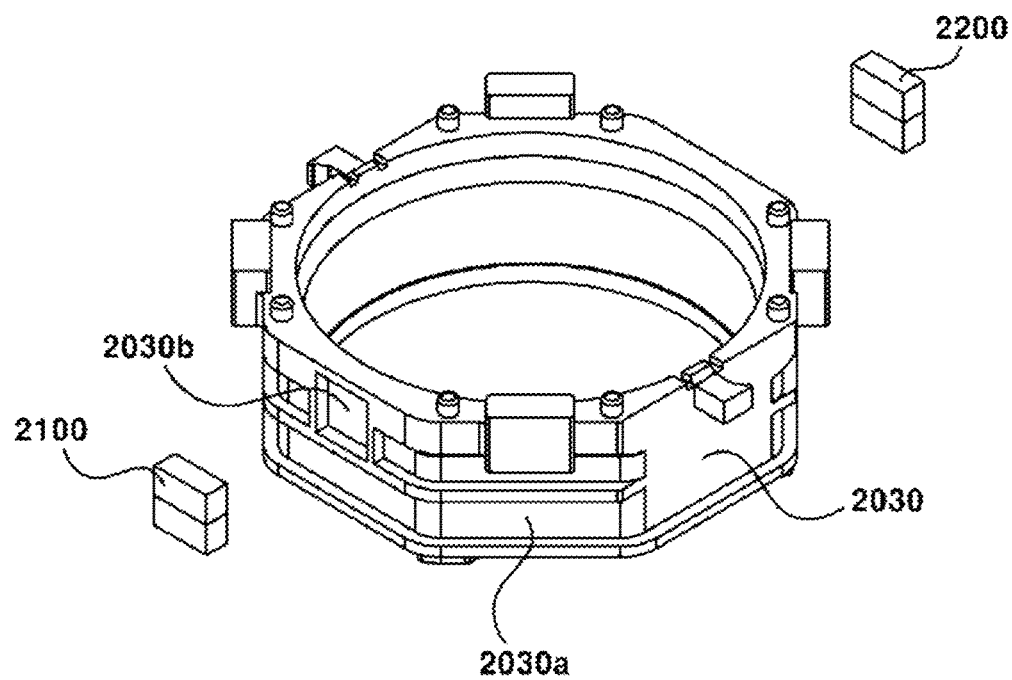
FIG. 17 is a magnified perspective view illustrating a bobbin of FIG. 16.
Figure 18:
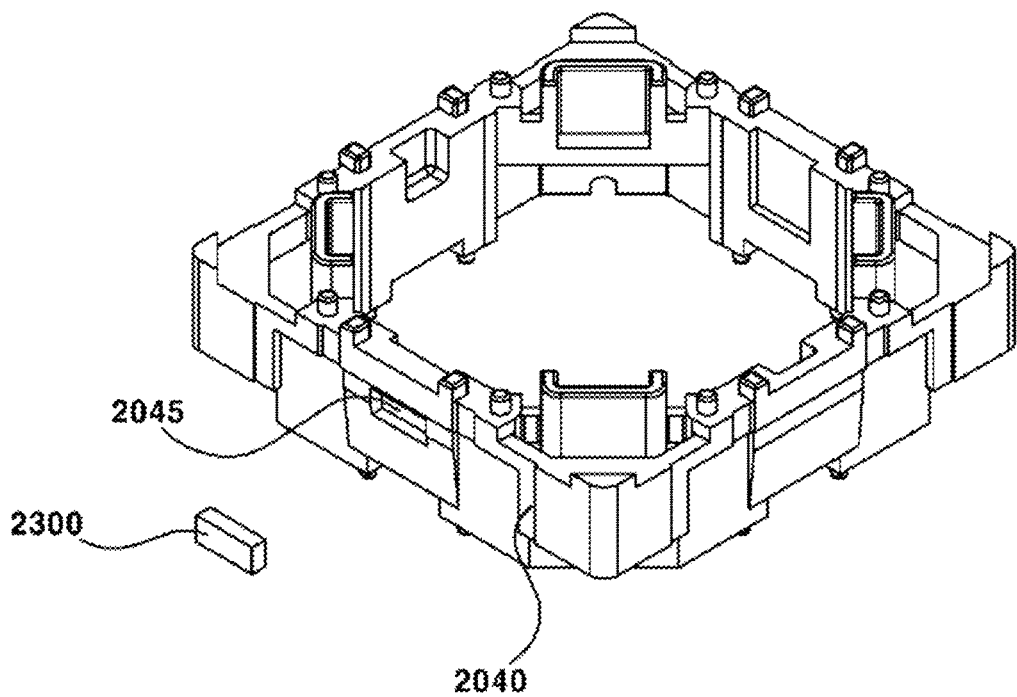
FIG. 18 is a magnified perspective view illustrating a holder member of FIG. 16.
Figure 19:
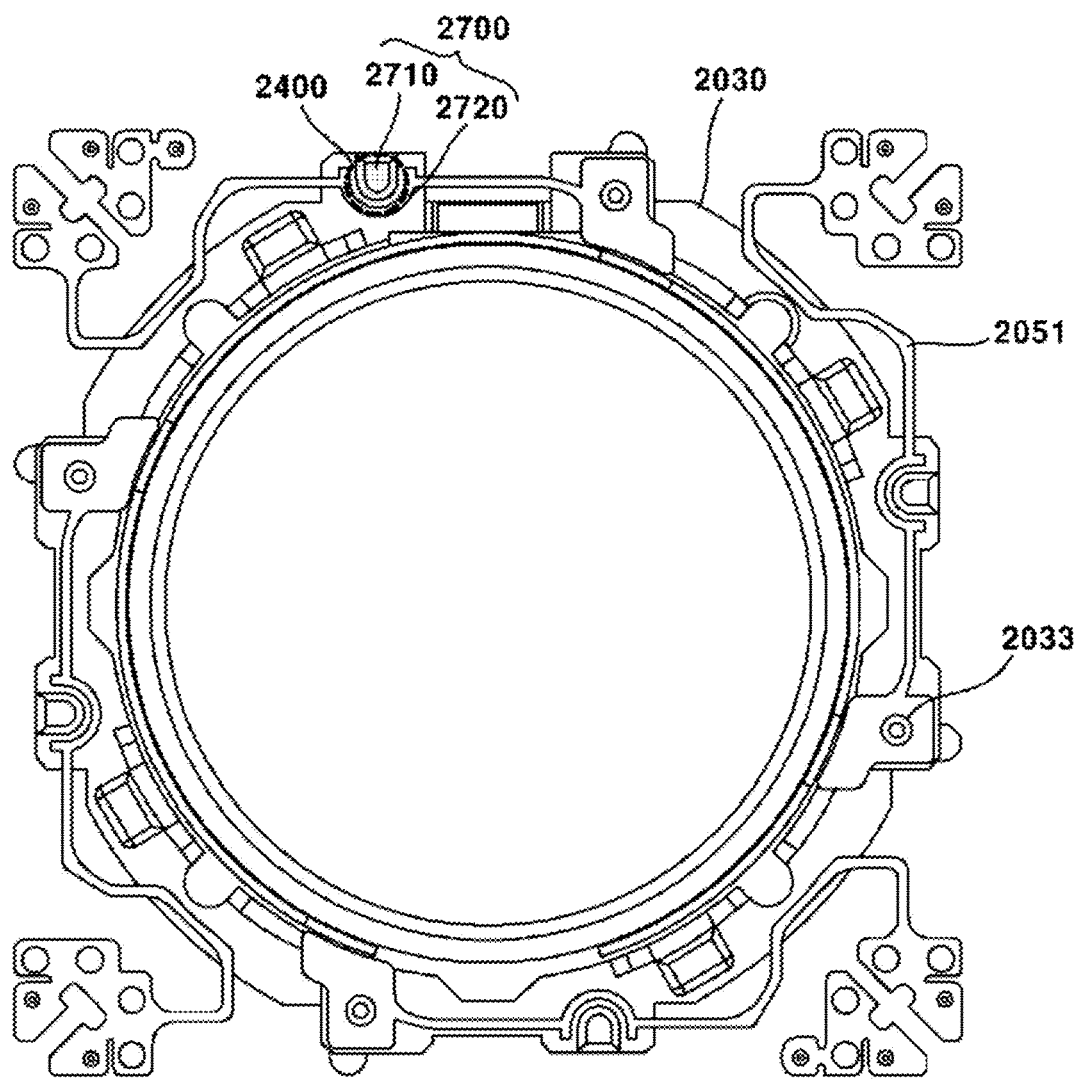
FIG. 19 is a plan view illustrating a coupled state of a bobbin and an upper elastic member and a shape of damping member according to a first exemplary embodiment.
Figure 20:
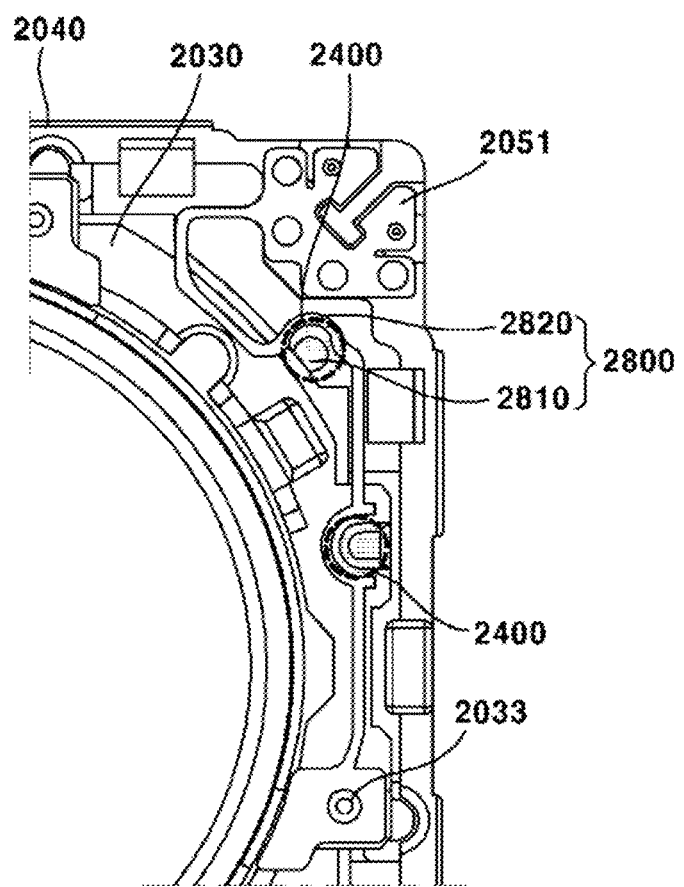
FIG. 20 is a plan view illustrating a coupled state of a bobbin and an upper elastic member and a shape of damping member according to a second exemplary embodiment.
Figure 21:
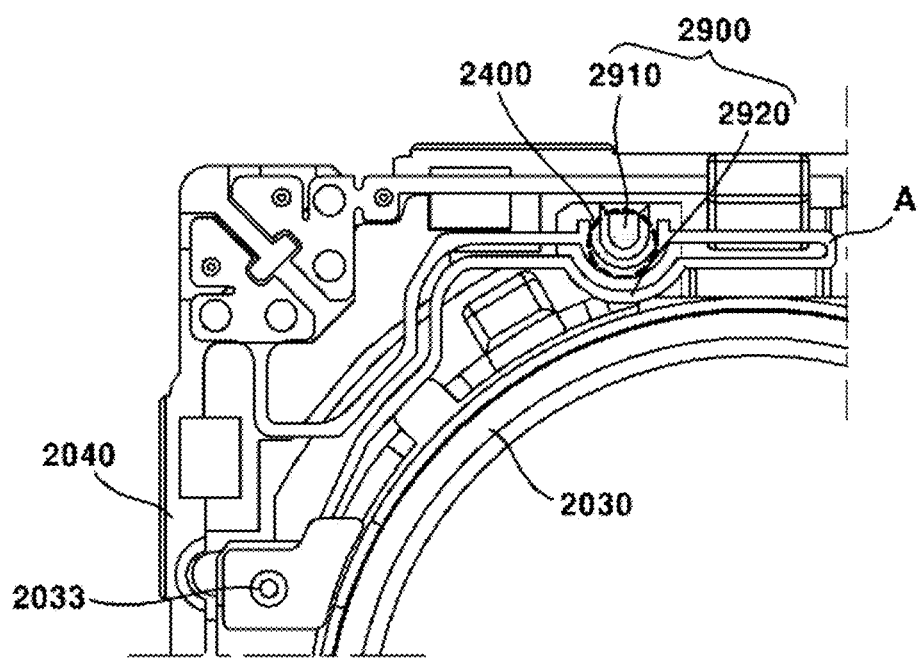
FIG. 21 is a plan view illustrating a coupled state of a bobbin and an upper elastic member and a shape of damping member according to a third exemplary embodiment.

FIG. 15 is a schematic perspective view illustrating a camera module according to an exemplary embodiment; FIG. 16 is an exploded perspective view of FIG. 15; FIG. 17 is a magnified perspective view illustrating a bobbin of FIG. 16; FIG. 18 is a magnified perspective view illustrating a holder member of FIG. 16; FIG. 19 is a plan view illustrating a coupled state of a bobbin and an upper elastic member and a shape of damping member according to a first exemplary embodiment; FIG. 20 is a plan view illustrating a coupled state of a bobbin and an upper elastic member and a shape of damping member according to a second exemplary embodiment; FIG. 21 is a plan view illustrating a coupled state of a bobbin and an upper elastic member and a shape of damping member according to a third exemplary embodiment; FIGS. 22 through 25 are schematic views illustrating available structures of a damping member and a support unit according to an exemplary embodiment; and FIGS. 26(*a*) and 26(*b*) show graphs illustrating resonance frequency gain change rate before and after applying a damping member according to an exemplary embodiment.

As illustrated in FIGS. 15 and 16, the lens driving device according to an exemplary embodiment may include a first lens driving unit (2001) and a second lens driving unit (2002). Here, the first lens driving unit (2001) may be a lens driving unit for auto-focus function, and the second lens driving unit (2002) may be a lens driving unit for handshake compensation function.

The first lens driving unit (2001) may include a base (2020), a bobbin (2030), and a holder member (2040). In addition, a cover member (2060) may be additionally provided to form an external appearance of the camera module. A holder member (2040) supporting a magnet (2041) may be arranged inside of the cover member (2060).

The base (2020) may be coupled to the cover member (2060).

The bobbin (2030) may be installed in an internal space of the cover member (2060) to be reciprocatively movable in an optical axis direction. A first coil (2031) may be installed at a coil accommodating portion (2030*a*) formed on an outer circumferential surface of the bobbin (2030).

An upper elastic member (2051) and a lower elastic member (2052) may be installed respectively at an upper portion and a lower portion of the bobbin (2030). An end of the upper elastic member (2051) may be connected to the bobbin (2030), and another end of the upper elastic member (2051) may be coupled to the holder member (2040), but not limited hereto. Alternatively, the other end of the upper elastic member (2051) may be coupled to the cover member (2060), as circumstances requires. In a case where the other end of the upper elastic member (2051) is coupled to the holder member (40), the other end of the upper elastic member (2051) may be coupled to an upper surface or a lower surface of the holder member (2040). An end of the lower elastic member (2052) may be connected to the bobbin (2030), and another end of the lower elastic member (2052) may be coupled to an upper surface of the base (2020), or may be coupled to a lower surface of the holder member (2040). In addition, a protrusion for coupling of the lower elastic member (2052) may be formed on a lower side of the base (2020). A hole or recess may be formed on the lower elastic member (2052), at a position corresponding to the position of the protrusion, such that the lower elastic member (2052) can be fixed by the coupling between the protrusion and the hole or recess. In addition, an adhesive may be additionally used for stronger coupling. Alternatively, the protrusion and the elastic member may be coupled by a method such as thermo-welding process.

Meanwhile, as illustrated in FIG. 16, the upper elastic member (2051) may be provided as two leaf springs in a two-sectional structure. The lower elastic member (2052) may be formed as a single body, so as to function as a socket for being applied with current. That is, the current applied through a terminal (2021*b*) may be delivered through the two springs of the upper elastic member (2052), and the delivered current may be applied to the first coil (2031) wound on the bobbin (2030). To this end, the upper elastic member (2051) and the first coil (2031) may be conductively connected using a method such as soldering, respectively. Here, the upper elastic member (2051) may include an external portion coupled to the holder member (2040), an internal portion coupled to the bobbin (2030), and a connection portion connecting the internal portion and the external portion. The internal portion may be electrically connected to both ends of the first coil (2031) using a method such as soldering. That is, both distal ends of the two springs and the first coil (2031) may be electrically connected with each other using means such as soldering, Ag epoxy, welding, conductive epoxy, etc. However, the exemplary embodiment is not limited hereto. Alternatively, in a reverse way, the lower elastic member (2052) may be formed in the two-sectional structure, and the upper elastic member (2051) may be formed as a single body. Alternatively, the upper elastic member (2051) may be possibly formed in a four-or more multi-sectional structure.

Bidirectional movements in the optical axis direction by the bobbin (2030) may be supported by the upper elastic member (2051) and the lower elastic member (2052). That is, the bobbin (2030) may be spaced from the holder member (2040) at a predetermined distance, such that the bobbin (2030) can be controlled to ascend and descend from the initial position of the bobbin (2030) as a center. Alternatively, the initial position of the bobbin (2030) may contact an upper portion or a lower portion of the holder member (2040), such that bobbin (2030) can be controlled to move only upward from the initial position of the bobbin (2030) as a center.

Meanwhile, the first unit (2031) may be provided as a coil block in a shape of ring coupled to an outer circumferential surface of the bobbin (2030), but not limited hereto. That is, a coil may be directly wound on an outer circumferential surface of the bobbin (2030) to form the first coil (2031). As illustrated in FIG. 16, the first coil (2031) may be installed at a position near to a lower surface of the bobbin (2030), and may include a straight surface and a curved surface according to a shape of the bobbin (2030).

Alternatively, the first coil (2031) formed as a coil block may be in an angular shape, for example, may be in an octagonal shape. That is, the first coil (2031) may be all formed of straight surfaces with no curved surface. This is by consideration of electromagnetic interaction with the magnet (2041) disposed oppositely. That is, the electromagnetic force can be maximized, when both surfaces of the magnet (2041) and the first coil (2031) facing each other are flat surfaces. However, the exemplary embodiment is not limited hereto. The surfaces of the magnet (2041) and the first coil (2031) may be formed as all curved surfaces, all flat surfaces, or one as a curved surface and the other as a flat surface, according to its design specification.

In addition, the bobbin (2030) may include a first surface flatly formed on a surface responding to the straight surface and a second surface roundly formed on a surface responding to the curved surface, such that the first coil (2031) can be coupled to an outer circumferential surface of the bobbin (2030), but not limited hereto. That is, the second surface may be also formed as a flat surface.

The holder member (2040) may be formed as a frame roughly in a shape of hexahedron. Coupling structures for the upper and the lower elastic member (2051, 2052) to be coupled may be provide on an upper and a lower surface of the holder member (2040), respectively. A magnet (2041) may be installed at four edge portions of the holder member (2040). Here, an accommodation portion (not illustrated in the drawings) may be formed at a position in which the magnet (2041) is to be installed as illustrated in FIG. 16. However, the present exemplary embodiment is not limited hereto. That is, the magnet (2041) may be adhesively fixed directly to an inner circumferential surface of the holder member (2040). The magnet (2041) may be fixed by being bonded on a side surface or on an edge of the holder member (2040), when the magnet (2041) is directly fixed to the holder member (2040) in such way as described in the above.

Alternatively, the lens driving device may include only a cover member (2060), without including a separate holder member (2040). The cover member (2060) may be formed of a metallic material that is a ferromagnetic substance such as iron. In addition, the cover member (2060) may be provided in an angular shape when viewed from the above, so as to cover a whole of the bobbin (2030). Here, the cover member (2060) may be in a rectangular shape as illustrated in FIGS. 15 and 16. Otherwise, although it is not illustrated in the drawings, the cover member (2060) may be provided in an octagonal shape. In addition, in a case where the cover member (2060) is in an octagonal shape when viewed from the above, if the shape of the magnet (2041) arranged at edges of the holder member (2040) is a trapezoid shape when viewed from the above, then the magnetic field emitted from edges of the holder member (2040) can be minimized.

Meanwhile, the lens driving device according to an exemplary embodiment may include a detection unit configured to detect motion of the bobbin (2030).

The detection unit may include a sensing magnet (2100) and a first position detection sensor (2300). Here, the first position detection sensor (2300) may be installed at the holder member (2040).

The sensing magnet (2100) may be formed smaller and thinner than the magnet (2041). As illustrated in the drawings, the sensing magnet (2040) may be provided as a rectangle polarized into an upper and a lower portion, but not limited hereto. The sensing magnet (2100) may be formed in a variety of shapes such as square, triangle, polygon, circle, etc.

The sensing magnet (2100) may be installed at an outer circumferential surface of the bobbin (2030). According to an exemplary embodiment, the sensing magnet (2100) may be fixed in a sensing magnet accommodation portion (2030b) formed at the bobbin (2030) using such as adhesive, glue, etc. Here, the sensing magnet accommodation portion (2030b) may be formed as a concave groove that is concavely formed from an outer circumferential surface of the bobbin (2030), but not limited hereto. Alternatively, an accommodation portion may be formed at a position where the sensing magnet (2100) can be arranged.

The concave depth of the sensing magnet accommodation portion (2030b) may be corresponding to the thickness of the sensing magnet (2100). Alternatively, the concave depth of the sensing magnet accommodation portion (2030b) may be formed lower or higher than the thickness of the sensing magnet (2100). In addition, the sensing magnet (2100) may be fixed to the sensing magnet accommodation portion (2030b) using such as an adhesive, such that the sensing magnet (2100) may not be protruded out of the guide.

In addition, the sensing magnet (2100) may be arranged at a position not interfering with the first coil (2031). That is, when the first coil (2031) is installed at a lower side of the bobbin (2030) as illustrated in FIG. 17, the sensing magnet (2100) may be arranged at an upper side of the bobbin (2030), or vice versa. This is in order to so locate the first coil (2031) as not to affect ascending/descending operations of the bobbin (2030) in the optical axis direction. However, the sensing magnet (2100) may also be arranged between the first coil unit (2031) and the bobbin (2030). Alternatively, the sensing magnet (2100) may be arranged at an upper surface of the first coil (2031) facing the cover member (2060) or the cover member (2060).

The sensing magnet (2100) may be so arranged as not to face the magnet (2041), as illustrated in FIGS. 16 and 17. That is, the sensing magnet (2100) may be so arranged as to face a lateral wall of the holder member (2040) as not to face to the magnet (2041), while two or four pieces of the magnets (2041) may be respectively installed at internal edge portions of the holder member (2040). The reason of such arrangement of the sensing magnet (2100) as not to face the magnet (2041) is, in order to inhibit interference between magnetic force change of the sensing magnet (2100) and magnetic force of the magnet (2041), such that the first position detection sensor (2300) can accurately feedback motions of the bobbin (2030). In addition, the sensing magnet (2100) may be arranged on an upper portion or a lower portion of the magnet (2041), while not facing the magnet (2041).

In addition, the sensing magnet (2100) may be polarized into an upper and a lower portion. Therefore, the first position detection sensor (2300) may detect ascending/descending movement of the sensing magnet (2100), so as to accurately detect ascending/descending operations of the bobbin (2030).

The first position detection sensor (2300) may be conductively connected to the circuit board (2021), and may output a position detection signal of the bobbin (2030). However, the present exemplary embodiment is not limited hereto. A separate board may be arranged on a lateral wall of the holder member (2040), and may be conductively connected with the first position detection sensor (2300).

In addition, as illustrated in FIG. 18, the first position detection sensor (2300) may be inserted in a position detection sensor accommodation portion (2045) formed on an outer circumferential surface of the holder member (2040). Here, an internal side of the lateral wall on which the accommodation portion (2045) is formed may form a concave portion, such that a thickness of the holder member (2040) can become the thinnest at the accommodation portion (2045). According to such structure, the distance between the first position detection sensor (2300) and the sensing magnet (2100) can be minimized, such that motions of the bobbin (2030) can be detected more accurately.

In addition, as illustrated in FIG. 16, a correction magnet (2200) may be additionally installed at a surface facing the surface where the sensing magnet (2100) is installed. However, this is a selectable option.

The correction magnet (2200) may be installed on an outer circumferential surface of the bobbin (2030). According to an exemplary embodiment, the correction magnet (2200) may be fixed to a correction magnet accommodation portion (not illustrated in the drawings) provided on the bobbin (2030) using such as adhesive. Here, the correction magnet accommodation portion may be provided as a concave groove concavely formed on an outer circumferential surface of the bobbin (2030), but not limited hereto. The correction magnet accommodation portion may be formed as a rib on a position where the correction magnet (2200) can be arranged. The correction magnet accommodation portion may be provided in a same shape as that of the sensing magnet accommodation portion described in the above. A concave depth of the correction magnet accommodation portion may be formed corresponding to a thickness of the correction magnet (2200), or otherwise, may be formed lower of higher than the thickness of the correction magnet (2200). Therefore, the correction magnet (2200) may not be protruded out of the guide, when the correction magnet (2200) is fixed to the correction magnet accommodation portion using such as adhesive, glue, etc.

The sensing magnet (2100) and the correction magnet (2200) may be provided in the same size. In addition, a center of the sensing magnet (2100) may be aligned with a center of the correction magnet (2200). According to such structure, the attractive force generated among the sensing magnet (2100), the correction magnet (2200) and the cover member (2060) may be offset with one another, such that the center of the bobbin (2030) is not tilting by being attracted to the cover member (2060) side. Therefore, the bobbin (2030) may not tilt to the cover member (2060) side and may be arranged near the center where the attractive force among the sensing magnet (2100), the correction magnet (2200) and the cover member (2060) establish equilibrium. Thereby, the bobbin (2030) can possibly move in the optical axis direction, with the center of the bobbin (2030) aligned with the optical axis.

Meanwhile, although an exemplary embodiment where the sensing magnet (2100) and the correction magnet (2200) are so disposed as to face a flat straight surface of the cover member (2060) has been described in the above, the present exemplary embodiment is not limited hereto. For example, the sensing magnet (2100) and the correction magnet (2200) may be so disposed as to face an edge side of the cover member (2060). In such case, the first position detection sensor (2300) may be arranged at an edge side of the cover member (2060) at a position corresponding to that of the sensing magnet (2100). In such case, the magnet (2041) may be arranged at a lateral surface of the holder member (2040).

According to another exemplary embodiment, the first position detection sensor (2300) may be arranged at the bobbin (2030), and the sensing magnet (2100) may be arranged at the holder member (2040). Alternatively, the magnet (2041) and the sensing magnet (2100) may be used in common, such that the sensing magnet (2100) may be omitted.

The support member (2042) may support movement of the holder member (2040) in order for the handshake compensation function. The support member (2042) may be formed as a leaf spring or a suspension wire. In addition, the magnet (2041) may be arranged at an edge of the holder member (2040), while the support member (2042) may be arranged at a lateral surface of the holder member (2040), or vice versa.

The first lens driving unit (2001) may be formed as described in the above. Otherwise, the first lens driving unit (2001) may be replaced with an optical system implementing another auto-focusing function, instead of the structure described in the above. That is, the first lens driving unit (2001) may be formed of an optical module using a single-lens moving actuator or an actuator of variable reactive index type, instead of using an auto-focusing actuator of VCM type. That is, any kind of optical actuator which is able to perform auto-focusing function may be used in the first lens driving unit (2001).

Meanwhile, as illustrated in FIGS. 16 through 19, the second lens driving unit (2002) may be a lens driving unit for handshake compensation function. The second lens driving unit (2002) may include the first lens driving unit (2001), a base (2020), a support member (2042), a first circuit board (2021), a second coil (2023), and a second position detection sensor (2021a). According to an exemplary embodiment, the second lens driving unit (2002) may further include a second circuit board (2022), such that the second coil (2023) may be arranged at the second circuit board (2022).

According to an exemplary embodiment, a control element to drive the lens driving device may be installed on the first circuit board (2021). A second coil (2023) in a pattern shape may be formed on the second circuit board (2022). The first and the second circuit board (2021, 2022) may be conductively connected to each other. The second circuit board (2022) may be arranged by being laminated on an upper side of the first circuit board (2021). However, the present exemplary embodiment is not limited hereto. The second lens driving unit (2002) may include only the first circuit board (2021), without the second circuit board (2022). In such case, the second coil (2023) may be assembled on the first circuit board (2021) as a separate component. As illustrated in FIG. 16, the first circuit board (2021) may be provided as an FPCB, and may be installed at an upper surface of the base (2020).

The second circuit board (2022) may be arranged by being laminated on an upper side of the first circuit board (2021). As illustrated in FIG. 20, the second circuit board (2022) may be arranged by being adhered to the first circuit board (2021).

The second coil (2023) may move the whole of the first lens driving unit (2001) in a direction of a flat surface perpendicular to the optical axis, through an interaction with the magnet (2041). As illustrated in FIG. 16, the second coil (2023) may be formed on the second circuit board (2022) by a pattern coil method. The second coil (2023) may be arranged at each of edge portions of the second circuit board (2022), at a position responding to a bottom surface of the magnet (2041).

As illustrated in FIG. 16, the second position detection sensor (2021*a*) may be installed at the first circuit board (2021), but not limited hereto. The second position sensor (2021*a*) may be arranged separately as an independent component, or otherwise, may be arranged at the second circuit board (2022). Here, the second position detection sensor (2021*a*) may detect movement of the holder member (2040) installed with the magnet (2041) in a direction perpendicular to the optical axis, by detecting magnetic field of the magnet (2041).

Meanwhile, according to an exemplary embodiment, the lens driving device that can simultaneously perform auto focus function and handshake compensation function may include a damping member (2400) in order to control phase and/or gain with respect to second, third, and fourth frequencies of the controller during operation of the bobbin (2030) and the holder member (2040) that operate as a driver for the auto focus function. Here, an arranged position of the damping member (2400) may be determined by the first support unit (2700). According to an exemplary embodiment, the damping member (2400) may be arranged at an upper surface of the bobbin (2030). To this end, the first support unit (2700) may include a first support portion (2710) and a second support portion (2720). In addition, a separate damping member (2400) may be additionally installed between the support member (2042) and the holder member (2040) in order to control phase and/or gain of the controller.

The first support portion (2710) may be integrally formed at an upper surface of the bobbin (2030). The first support portion (2710) may be provided in a shape of a protrusion. In addition, the second support portion (2720) may be formed at a position corresponding to that of the first support portion (2710) of the first elastic member (2051), such that the second support portion (2720) may cover a circumference of the first support portion (2710). In addition, the second support portion (2720) may be formed at some part of a connecting portion of the upper elastic member (2051).

The first support portion (2710) and the second support portion (2720) may be formed in a variety of shapes. According to some exemplary embodiments, the shapes of the first support portion (2710) and the second support portion (2720) may be formed as illustrated in FIGS. 22 through 25, but not limited hereto. Thus, any structure such that the second support portion (2720) covers a circumference of the first support portion (2710) may be employed.

Figure 22:
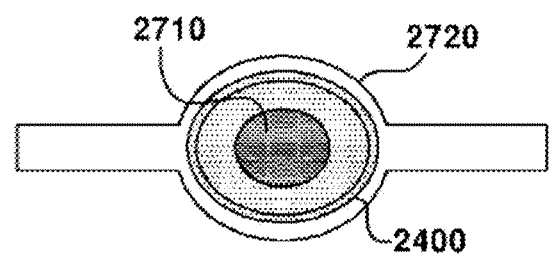
FIGS. 22 through 25 are schematic views illustrating available structures of a damping member and a support unit according to an exemplary embodiment.

For example, the first support portion (2710) may be protrusively arranged at a center as illustrated in FIG. 22, and the second support portion (2720) may be spaced apart from the first support portion (2710) at a predetermined distance, such that the first support portion (2710) can be arranged at a center. Here, the second support portion (2720) may be provided in a shape of a ring. In addition, the first support portion (2710) and the second support portion (2720) may be concentrically arranged, such that the damping member (1400) may be coated at a center of the first support portion (2710) and the second support portion (2720) or between the first support portion (2710) and the second support portion (2720).

Figure 23:
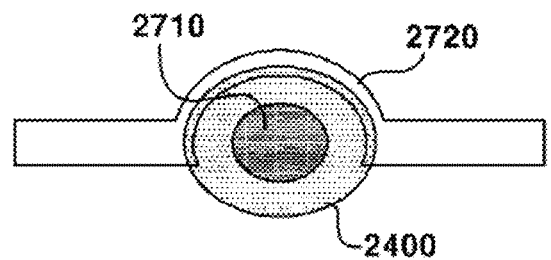

Alternatively, the second support portion (2720) may include an opening at one side thereof. That is, as illustrated in FIG. 23, the second support portion (2720) may be integrally formed with the upper elastic member (2051), in a shape of an arc not interfering with the first support portion (2710), such that damping member (2400) may be coated while the first support portion (2710) and the second support portion (2720) are symmetrically arranged.

Figure 24:
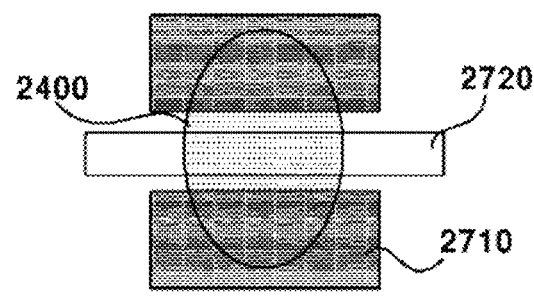

Alternatively, the first support portion (2710) may be formed as a pair of protrusions as illustrated in FIG. 24. These protrusions may be spaced apart from each other at a predetermined distance to form a concave groove. In addition, the second support portion (2720) may be provided in straight shape, such that the second support portion (2720) can pass through the concave groove. In addition, the damping member (2400) may be coated such that the damping member (2400) can contact both of the first support portion (2710) and the second support portion (2720).

Figure 25:
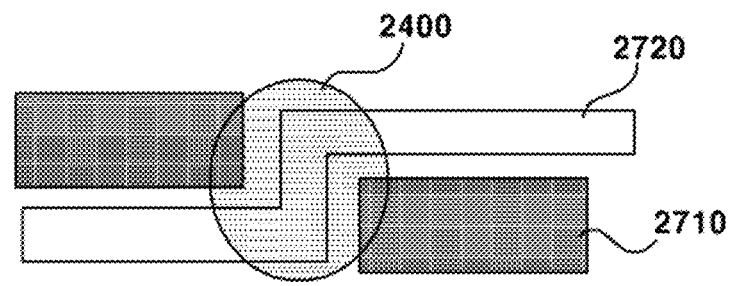
Figure 26A:
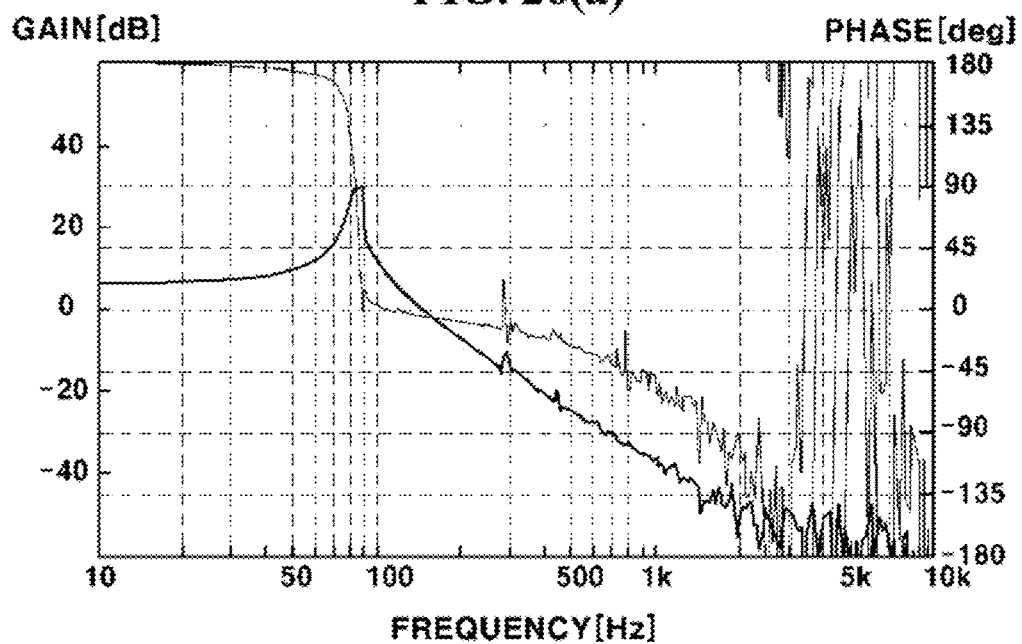
FIGS. 26(a) and 26(b) show graphs illustrating resonance frequency gain change rate before and after applying a damping member according to an exemplary embodiment.
Figure 26B:
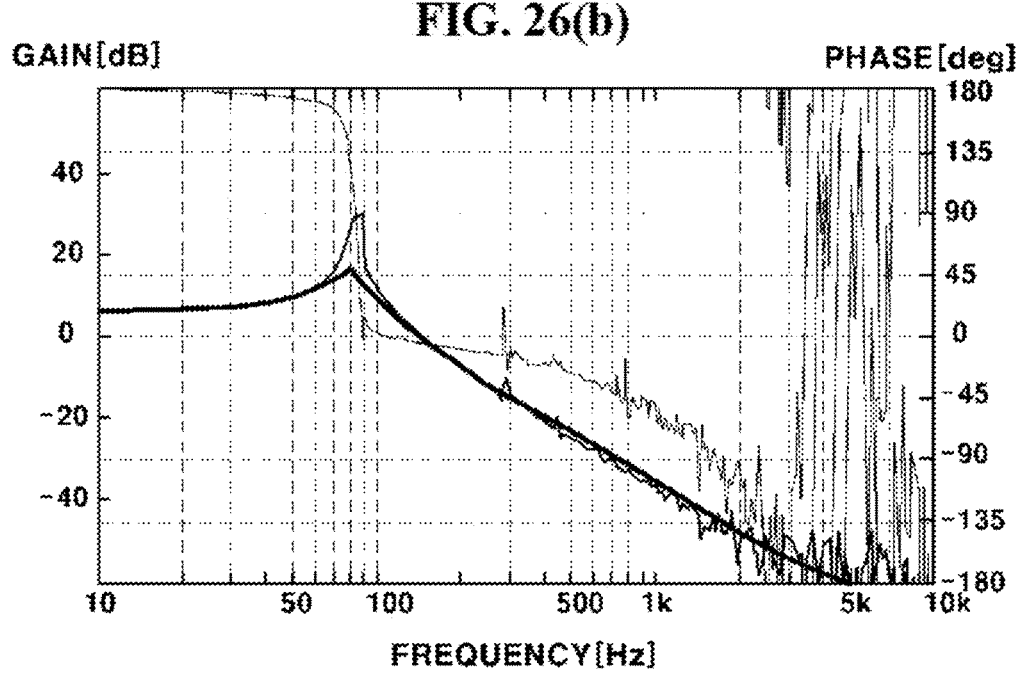

Alternatively, the first support portion (2710) may be formed as a pair of protrusions as illustrated in FIG. 25. These protrusions may be spaced apart from each other at a predetermined distance, while these protrusion are arranged so mismatched as not to face each other and forming an L-shaped gap. In addition, the second support portion (2720) may be curved at least sixteen times, such that the second support portion (2720) can pass through the gap. In addition, the damping member (2400) may be coated such that the damping member (2400) can contact both of the first support portion (2710) and the second support portion (2720).

Meanwhile, as illustrated in FIG. 19, the first support unit (2700) may be protruded on the bobbin (2030) and spaced apart from the fixing protrusion (2033) fixed to an end of the upper elastic member (2051). That is, the position where the upper elastic member (2051) is fixed may be different from the position where the damping member (2400) is coated or arranged. In addition, the first support unit (2700) and the fixing protrusion (2033) may be arranged at the same surface of the bobbin (2030). For example, in a case where the bobbin (2030) is generally in an octagonal shape including eight surfaces, the fixing protrusion (2033) and the first support unit (2700) may be respectively arranged at lateral wall sides forming four surfaces of the bobbin (2030), such that the fixing protrusion (2033) and the first support unit (2700) may be respectively arranged to form a pair of each.

Meanwhile, as illustrated in FIG. 20, the second support unit (2800) may be further provided in addition to the first support unit (2700). Alternatively, only the second support unit (2800) may be provided without the first support unit (2700). Here, the second support unit (2800) may be arranged between a fixing portion fixing the upper elastic member (2051) to the holder member (2040) and the fixing protrusion (2033), on an upper surface of the holder member (2040). In addition the first support unit (2700) may be spaced apart from the second support unit (2800) at a predetermined distance. For example, in a case where the bobbin (2030) is in an octagonal shape, the fixing protrusion (2033) and the first support unit (2700) may be arranged at four wall surfaces, and the second support unit (2800) may be arranged at four other surfaces where the first support unit (2700) is not arranged. Here, the damping member (2400) to be coated at the first support unit (2700) and the second support unit (2800) may be formed as the same.

According to an exemplary embodiment, the second support unit (2800) may include a third support unit (2810) and a fourth support unit (2820).

The third support portion (2810) may be protrusively formed on an upper surface of the holder member (2040). As illustrated in the figures, the third support portion (2810) may be spaced apart from the first support portion (2710) (see FIG. 19) at a predetermined distance. The third support portion (2810) may guide an arranged position of the damping member (2400) with the first support portion (2710). The third support portion (2810) may be connected to the fourth support portion (2820) by the coated damping member (2400), and may perform a function to fix the upper elastic member (2051) to the holder member (2040).

The fourth support member (2820) may be integrally formed with the upper elastic member (2051). As illustrated in the figures, the fourth support member (2820) may be formed in a shape encompassing the third support portion (2810). The fourth support member (2820) may be formed in various shapes. For example, as illustrated in FIG. 20, the fourth support member (2820) may be in shape of an arc to encompass the third support portion (2810), but not limited hereto. The shape of the fourth support member (2820) may be as variously formed as the shape of the second support member (2720) illustrated in FIGS. 22 to 25.

Meanwhile, the second support unit (2800) may be arranged between a fixing portion fixing the upper elastic member (2051) to the holder member (2040) and the first support portion (2700), on an upper surface of the holder member (2040). The second support unit (2800) may be spaced apart from an outer circumferential surface of the bobbin (2030) at a predetermined distance, in order to inhibit interference during ascending/descending operations of the bobbin (2030).

According to such structure, the damping member (2400) may be arranged at the bobbin (2030) through the first support unit (2700), and/or the damping member (2400) may be arranged at the holder member (2040) through the second support unit (2800). Thereby, at least one of the bobbin (2030) and the holder member (2040) can have the damping member (2400) coated thereon. Therefore, the liability of the product can be enhanced, and the shape of the upper elastic member (2051) can be simplified as well.

Meanwhile, as illustrated in FIG. 21, the third support unit (2900) may optionally be installed at a position of the first support unit (2700) or at a position of the second support unit (2800), in replacement or in combination. That is, only the third support unit (2900) may be provided, while both the first support unit (2700) and the second support unit (2800) are excluded. Alternatively, any one or two or all of the first, second, and third support units (2700)(2800)(2900) may be configured as a single piece or in combination. The third support unit (2900) may include a fifth support portion (2910) and a sixth support portion (2920).

The fifth support portion (2910) may be protrusively formed on an upper surface of the bobbin (2030) or on an upper surface of holder member (2040). The structure of the fifth support portion (2910) may be the same as that of the first support portion (2100, see FIG. 19) as described in the above. The fifth support portion (2910) may be protrusively formed on an upper surface of the bobbin (2030) or on an upper surface of holder member (2040) in shape of a protrusion. The fifth support portion (2910) may interconnect the upper elastic member (2051) with the damping member (2400).

The sixth support portion (2920) may be integrally formed with the upper elastic member (2051). As illustrated in FIG. 21, the sixth support portion (2920) may be so formed as to encompass the fifth support portion (2910) at least sixteen times. That is, one end of the upper elastic member (2051) may be fixed to the fixing protrusion (2033) and another end of the upper elastic member (2051) may be fixed to the holder member (2040), while the upper elastic member (2051) connected to the both ends may arrange the structure of the sixth support portion (2920) curved in shape of an arc as being overlaid. For example, in a case where the fixing protrusions (2033) are formed at total four positions and the shape of the bobbin (2030) is octagonal, total four pieces of the fifth support portions (2910) may be protrusively formed, while two of each are protruded at a pair of end portions facing each other and two of each are formed at the surface where the fifth support portion (2910) is formed. However, the present exemplary embodiment is not limited hereto. The fifth support portion (2910) and the sixth support portion (2920) may be used with the first support unit (2700), or may be used with both the first and second support units (2700) (2800).

As described in the above, when the damping member (2400) is coated through the first to third support units (2700, 2800, 2900), the amount of increasing damping member (2400) may decrease less than half in comparison with the conventional lens driving device. Thereby, damage in the damping member (2400) can be minimized.

According to an exemplary embodiment, the damping member (2400) may be coated at a connecting portion of the bobbin (2030) and the upper elastic member (2051) through the support unit (2700). Thereby, the damping member (2400) may be inhibited from permeating into other components such as an inside of the bobbin (2030) during the coating process of the damping member (2400).

According to an exemplary embodiment, the height of the first, third, and fifth support portion (2710, 2720, 2730) in shape of a protrusion formed at the bobbin (2030) may be formed the same as or higher than the height of the upper elastic member (2051). Thereby, flow and driving distance of the damping member (2400) can be minimized.

According to an exemplary embodiment, the spring leg of the upper elastic member (2051) may be formed to be thick in a width direction and long in a length direction. Thereby, the second frequency in left and right width directions can be moved to after 300 Hz, while the first frequency is maintained as similar to that of the conventional device. Thus, the device can be controlled more easily.

According to an exemplary embodiment, the damper member (2040) may be coated between fixed portions of the upper elastic member (2051) and the holder member (2040), or between the bobbin (2030) and the upper elastic member (2051), such that the amount of damper in the damping member (2400) can be easily controlled. Therefore, distribution and usability of the product can be improved.

According to an exemplary embodiment, the gain may be suppressed or Q-value may be lowered to stabilize phase shift, via additional introduction of the damping member (2400). Therefore, the instability of feedback control, caused by rapid phase shift when the change of the gain is rapid in resonant frequency, can be improved. In addition, the peak reduction of resonant frequency and second, third, and fourth resonant frequency can be suppressed.

According to an exemplary embodiment, the connecting portion (2051) of the upper elastic member (2051) may be curved at least once (see 'A' of FIG. 21), by coating of the damping member (2400) between fixed portions of the upper elastic member (2051), or between a part of a connecting portion of the upper elastic member (2051) and the holder member (2040). Thereby, the change in frequency can be stabilized.

Meanwhile, according to an exemplary embodiment, the lens driving device having the sensing magnet (2100) and the correction magnet (2200) formed as illustrated in FIGS. 15 to 18 may be controlled in a single direction, and may also controlled bi-directionally. That is, the base (2020) and the bobbin (2030) may be arranged by adhering onto their initial position. For example, a stopper may be form the initial position by being protruded on the base (2020) side and contacting a bottom surface of the bobbin (2030). Otherwise, although it is not illustrated in the drawings, the stopper may be protruded on the bottom surface of the bobbin (2030) and may be arranged by contacting with an upper surface of the base (2020). In such case, a predetermined prepress may be applied to the upper and the lower elastic member (2051, 2052), such that the initial position of the bobbin (2030) can adhere to the base (2020). Thus, the bobbin (2030) may ascend by the electromagnetic interaction, when electric power is applied. On the contrary, the bobbin (2030) may return to the initial position by the restoring force of the upper and the lower elastic member (2051, 2052), when the electric power is shut off.

Alternatively, the base (2020) and the bobbin (2030) may be arranged by being spaced from the initial position at a predetermined distance. In such case, the upper and lower elastic member (2051, 2052) may be formed in a flat shape with no prepress applied. Otherwise, the upper and lower elastic member (2051, 2052) may be formed with a predetermined prepress applied. In such case, the bobbin (2030) may ascend or descend according to the polarity of current, when the electric power is applied in the initial state where the bobbin (2030) is spaced apart from the base (2020) at a predetermined distance. That is, the bobbin (2030) may ascend the initial position as a standard, when a normal current is applied. In addition, the bobbin (2030) may descend from the initial position as a standard, when a reverse current is applied.

As described in the above, according to an exemplary embodiment, time required for auto-focus operation can be minimized, because more accurate position of the bobbin (2030) can be detected using the sensing magnet (2100), when performing the auto-focus function by controlling the bobbin (1030) to ascend or descend. In particular, the correction magnet (2200) installed at a side facing the sensing magnet (2100) may offset the attractive force between the sensing magnet (2100) and the cover member (2060), such that the bobbin (2030) can move while keeping concentric with the cover member (2060) as far as possible.

The camera module may include a lens moving device formed as described in the above, a lens barrel coupled to the bobbin (2030), an image sensor (2011), and a PCB (2010). Here, the image sensor (2011) may be mounted on the PCB (2010). The PCB (2010) may form a bottom surface of the camera module.

The bobbin (2030) may include a lens barrel. At least one lens may be installed in the lens barrel. The lens barrel may be screw-coupled to an inside of the bobbin (2030), but not limited hereto. The lens barrel may be directly fixed to an inside of the bobbin (2030) by other means than the screw-coupling, or otherwise, one or more lenses may be integrally formed with the bobbin (30) as a single body without the lens barrel. The lens may be formed of a single piece, or otherwise, may be formed of two or more lenses to compose an optical system.

An infrared cut-off filter may be additionally installed at a position responding to the image sensor (2011) on the base (2020). The base (2020) may be coupled to the holder member (2040). In addition, the base (2020) may support a lower side of the holder member (2040). A separate terminal member may be installed on the base (2020), in order for conductivity with the PCB (2010). The terminal may be integrally formed with the base (2020) using such as surface electrodes. Meanwhile, the base (2020) may function as a sensor holder to protect the image sensor (2011). In such case, a protrusion may be formed in a downward direction along a side surface of the base (2020). However, this is not an essential structure. Therefore, although it is not illustrated in the drawings, a separate sensor holder may be arranged at a lower portion of the base (2020) to function as the sensor holder.

In the above, all elements composing an exemplary embodiment of the present disclosure have been described as being integrally combined or operating in combination, however, the present disclosure is not limited hereto. That is, within the scope of purpose of the present disclosure, at least one of all such elements may be selectively combined to operate. In addition, the terms such as "include", "comprise" or "have" are state that there may be in existence of features, numbers, steps, functions, elements, components described herein, or compositions thereof. Therefore, they shall not be understood as to exclude the possibility of existence or addition of one or more other features, numbers, steps, functions, elements, components described herein, or compositions thereof.

Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present specification. In the above, exemplary embodiments of the present disclosure have been described. However, these embodiments are merely examples and do not limit the present invention, so that persons who skilled in the art of the present disclosure may easily transform and modify within the limit of the technical spirit of the present disclosure. For example, each of the components shown in detail in the embodiments of the present invention may be implemented in transformation. In addition, the differences relating these transformations and modifications shall be regarded to be included in the scope of the present disclosure as defined in the attached claims of the present disclosure and the equivalents thereof.

What is claimed is:

1. A lens driving device, comprising:
   a holder member;
   a bobbin disposed in the holder member;
   a first coil disposed on the bobbin;
   a first magnet disposed on the holder member and facing the first coil;
   a base spaced apart from the holder member;
   a circuit board disposed on the base and comprising a second coil facing the first magnet;
   an upper elastic member coupled to an upper portion of the bobbin and an upper portion of the holder member;
   a lower elastic member coupled to a lower portion of the bobbin and a lower portion of the holder member;
   a wire coupled to the upper elastic member and the circuit board; and
   a damping member connecting the lower elastic member and the circuit board.

2. The lens driving device of claim 1, wherein the circuit board comprises a first circuit board disposed on an upper surface of the base and a second circuit board disposed on an upper surface of the first circuit board,
   wherein the second circuit board comprises the second coil, and
   wherein the damping member connects a lower surface of the lower elastic member and an upper surface of the second circuit board.

3. The lens driving device of claim 2, wherein a distance between the lower surface of the lower elastic member and the upper surface of the second circuit board is formed within the range of 0.1 mm~0.4 mm.

4. The lens driving device of claim 1, wherein the damping member is spaced apart from the wire, and
wherein the damping member is nearer to the wire than it is to an optical axis.

5. The lens driving device of claim 1, wherein the damping member is so disposed as not to interfere with the wire, and
wherein the damping member adheres on a lower surface of the lower elastic member.

6. The lens driving device of claim 1,
wherein the damping member is disposed on a corner portion of the circuit board.

7. The lens driving device of claim 1, wherein the circuit board comprises an opening overlapped with an optical axis, and
wherein the damping member is nearer to an outer side surface of the circuit board than is the opening.

8. The lens driving device of claim 1, wherein the damping member comprises four damping part,
wherein each of the four damping parts is respectively disposed on each of four corner portions of the circuit board.

9. The lens driving device of claim 1, wherein the damping member is directly contacted with the holder member and the base.

10. The lens driving device of claim 1, wherein at least a portion of the damping member is between the first magnet and the wire.

11. The lens driving device of claim 1, wherein the lower elastic member comprises an inner portion coupled to the lower portion of the bobbin, an outer portion coupled to the lower portion of the holder member and a connection portion connecting the inner portion and the outer portion, and
wherein the damping member is connected to the outer portion of the lower elastic member.

12. The lens driving device of claim 1, comprising:
a second magnet disposed on the bobbin; and
a sensor disposed on the holder member and sensing the second magnet.

13. A camera module, comprising:
a printed circuit board (PCB);
an image sensor disposed on the PCB;
the lens driving device of claim 1; and
a lens coupled to the bobbin of the lens driving device.

14. A lens driving device, comprising:
a moving part comprising a holder member, a bobbin disposed in the holder member, a first coil disposed on the bobbin, a first magnet disposed on the holder member and facing the first coil, and an elastic member coupled to the bobbin and the holder member;
a fixing part comprising a base spaced apart from the moving part, and a circuit board disposed on the base and comprising a second coil facing the first magnet;
a wire connecting the moving part and the fixing part; and
a damping member connects the moving part and the fixing part.

15. The lens driving device of claim 14, wherein the elastic member comprises an upper elastic member coupled to an upper portion of the bobbin and an upper portion of the holder member and a lower elastic member coupled to a lower portion of the bobbin and a lower portion of the holder member, and
wherein the damping member is contacted to a lower surface of the lower elastic member.

16. The lens driving device of claim 15, wherein the circuit board comprises a first circuit board disposed on an upper surface of the base and a second circuit board disposed on an upper surface of the first circuit board,
wherein the first circuit board comprises a plurality of terminals,
wherein the second circuit board comprises the second coil,
wherein the wire coupled to the upper elastic member and the first circuit board; and
wherein the damping member is contacted to an upper surface of the second circuit board.

17. The lens driving device of claim 16, wherein the damping member is spaced apart from the wire.

18. A lens driving device, comprising:
a holder member;
a bobbin disposed in the holder member;
a first coil disposed on the bobbin;
a magnet disposed on the holder member;
a base spaced apart from the holder member;
a circuit board disposed on the base;
an elastic member coupled to the bobbin and the holder member;
a wire coupled to the elastic member and the circuit board; and
a damping member disposed between a lower surface of the holder member and the circuit board.

19. The lens driving device of claim 18, wherein the first coil faces the magnet in a first direction, and
wherein the circuit board comprises a second coil facing the magnet in a second direction perpendicular to the first direction.

20. The lens driving device of claim 19, wherein the second direction is parallel to an optical axis.

* * * * *